(12) United States Patent
Abe et al.

(10) Patent No.: US 9,735,423 B2
(45) Date of Patent: Aug. 15, 2017

(54) NONAQUEOUS ELECTROLYTE SECONDARY BATTERY AND CATHODE SHEET THEREFOR

(75) Inventors: Masao Abe, Ibaraki (JP); Akira Otani, Ibaraki (JP); Yujiro Kawashima, Ibaraki (JP); Yoshihiro Uetani, Ibaraki (JP); Hiroyoshi Take, Ibaraki (JP); Yutaka Kishii, Ibaraki (JP); Aimi Matsuura, Ibaraki (JP); Yuki Kajisa, Ibaraki (JP); Yohei Ando, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 510 days.

(21) Appl. No.: 14/129,639

(22) PCT Filed: Jun. 27, 2012

(86) PCT No.: PCT/JP2012/067032
§ 371 (c)(1),
(2), (4) Date: Apr. 11, 2014

(87) PCT Pub. No.: WO2013/002415
PCT Pub. Date: Jan. 3, 2013

(65) Prior Publication Data
US 2014/0220438 A1 Aug. 7, 2014

(30) Foreign Application Priority Data

Jun. 29, 2011 (JP) .................................. 2011-143690
Apr. 3, 2012 (JP) .................................. 2012-084921

(51) Int. Cl.
*H01M 4/36* (2006.01)
*H01M 4/13* (2010.01)
(Continued)

(52) U.S. Cl.
CPC ............ *H01M 4/366* (2013.01); *H01M 4/137* (2013.01); *H01M 4/606* (2013.01); *H01M 4/62* (2013.01);
(Continued)

(58) Field of Classification Search
CPC ........... H01M 10/052; H01M 10/0566; H01M 4/137; H01M 4/366; H01M 4/60; H01M 4/62
See application file for complete search history.

(56) References Cited

U.S. PATENT DOCUMENTS 2,708,683 A * 5/1955 Eisen ...................... H01M 4/02
427/115
3,303,054 A 2/1967 Gruber et al.
(Continued)

FOREIGN PATENT DOCUMENTS

CN 87 1 08059 A 6/1988
CN 88 1 01323 A 11/1988
(Continued)

OTHER PUBLICATIONS

Machine Translation of: Sakata, Jiro (JP 2009/093880 A), Apr. 30, 2009.*
(Continued)

*Primary Examiner* — Kenneth Douyette
(74) *Attorney, Agent, or Firm* — Sughrue Mion, PLLC

(57) ABSTRACT

The invention provides a nonaqueous electrolyte secondary battery having a cathode and an anode arranged so as to be opposite to each other, and an electrolyte layer put therebetween;
wherein the cathode comprises:
(a) a conductive polymer and
(b) at least one selected from the group consisting of a polycarboxylic acid and a metal salt thereof, and
(Continued)

wherein the anode comprises a material into which a base metal or ions thereof can be inserted and from which a base metal or ions thereof can be extracted. The invention further provides a cathode sheet for use in the nonaqueous electrolyte secondary battery mentioned above.

8 Claims, 19 Drawing Sheets

(51) Int. Cl.
*H01M 4/62* (2006.01)
*H01M 10/052* (2010.01)
*H01M 4/137* (2010.01)
*H01M 4/60* (2006.01)
*H01M 4/02* (2006.01)

(52) U.S. Cl.
CPC .... *H01M 10/052* (2013.01); *H01M 2004/028* (2013.01)

(56) References Cited

U.S. PATENT DOCUMENTS

| | | | |
|---|---|---|---|
| 6,316,142 | B1 | 11/2001 | Delnick et al. |
| 2003/0091899 | A1 | 5/2003 | Matsubara et al. |
| 2004/0110062 | A1* | 6/2004 | Harada ............ C08G 73/0266 429/213 |
| 2007/0190422 | A1* | 8/2007 | Morris ................ H01M 4/364 429/231.4 |
| 2009/0053602 | A1* | 2/2009 | Sakitani ............ H01M 4/0404 429/213 |
| 2009/0136848 | A1 | 5/2009 | Minami et al. |
| 2010/0062333 | A1 | 3/2010 | Chuang et al. |
| 2010/0181527 | A1 | 7/2010 | Nesvadba et al. |
| 2012/0009479 | A1 | 1/2012 | Kobori et al. |

FOREIGN PATENT DOCUMENTS

| | | |
|---|---|---|
| CN | 1409418 A | 4/2003 |
| EP | 0 269 090 A1 | 6/1988 |
| EP | 0 282 068 A2 | 9/1988 |
| JP | 11-40143 A | 2/1999 |
| JP | 2002-246028 A | 8/2002 |
| JP | 2002-251999 A | 9/2002 |
| JP | 2009-93880 A | 4/2009 |
| JP | 2010-530602 A | 9/2010 |
| WO | 2004/001881 A2 | 12/2003 |
| WO | 2010/122975 A1 | 10/2010 |

OTHER PUBLICATIONS

International Search Report of PCT/JP2012/067032 dated Sep. 4, 2012.
The Extended European search report dated Jan. 7, 2015, issued by the European Patent Office in corresponding European Application No. 12804920.2.
First Notification of Reasons for Rejection dated Aug. 11, 2015, issued by the State Intellectual Property Office of the P.R.C. in corresponding Chinese Application No. 201280042483.0.
Sung Yeol Kim et al., "Enhancing the stability and performance of a battery cathode using a non-aqueous electrolyte", Electrochemistry Communications, 2010, vol. 12, pp. 761-764.
Extended European Search Report dated Jul. 18, 2016, from the European Patent Office in counterpart European application No. 16156876.1.

* cited by examiner

1μm

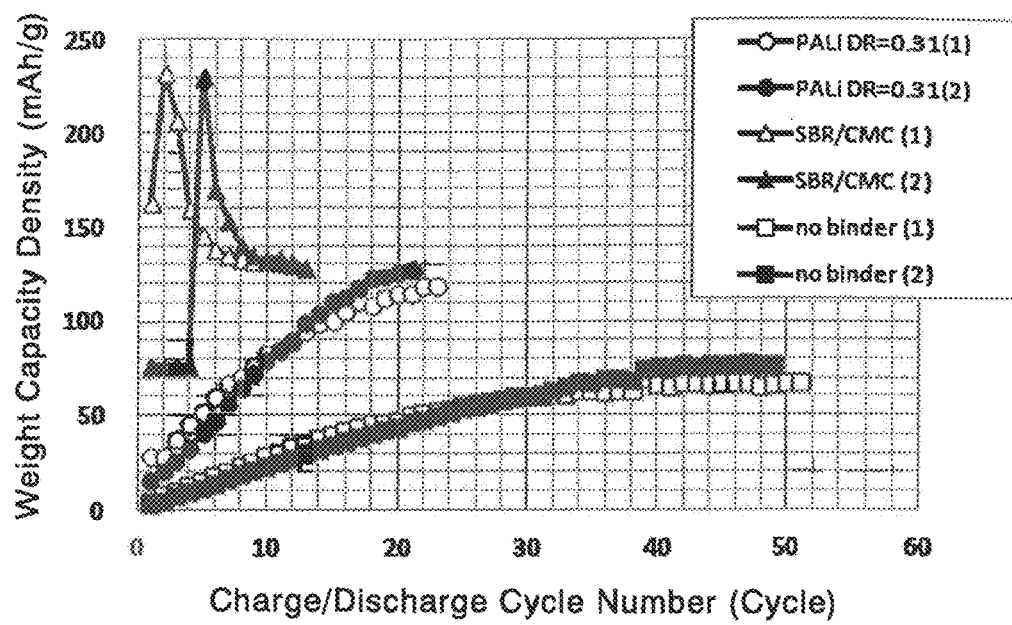
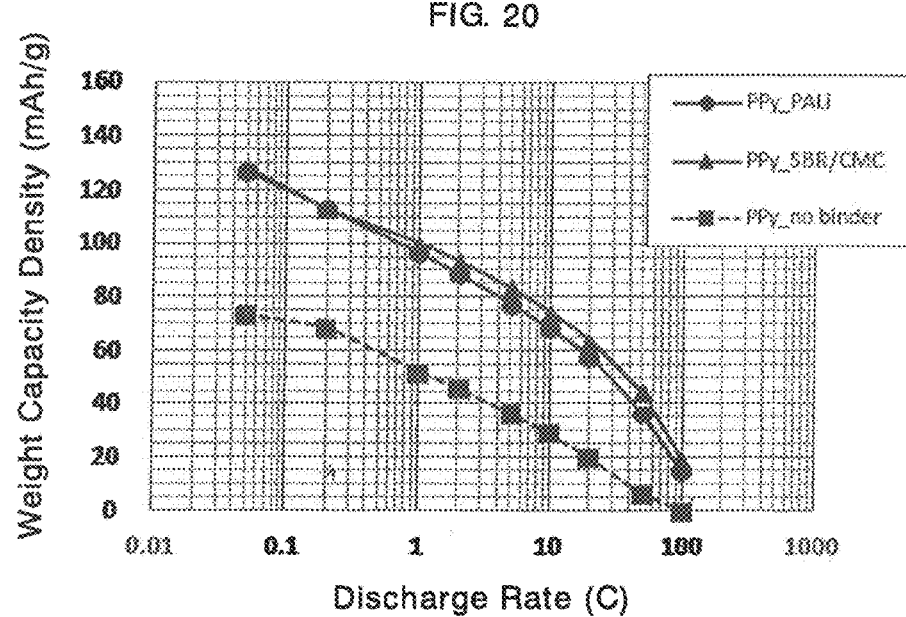

0.2μm

NONAQUEOUS ELECTROLYTE SECONDARY BATTERY AND CATHODE SHEET THEREFOR

CROSS REFERENCE TO RELATED APPLICATIONS

This application is a National Stage of International Application No. PCT/JP2012/067032, filed on Jun. 27, 2012, which claims priority from Japanese Patent Application Nos. 2011- 143690, filed on Jun. 29, 2011, and 2012-084921, filed on Apr. 3, 2012, the contents of all of which are incorporated herein by reference in their entirety.

TECHNICAL FIELD

The present invention relates to a nonaqueous electrolyte secondary battery and a cathode sheet therefor. More particularly, the invention relates to a nonaqueous electrolyte secondary battery, preferably a lithium secondary battery, which is superior in weight energy density and weight power density, and in addition, in cycle characteristics. The invention further relates to a cathode sheet for use in the nonaqueous electrolyte secondary battery.

BACKGROUND ART

With the progress and advance of electronics in the fields of portable personal computers, mobile phones, and personal digital assistances (PDA) in recent years, a secondary battery which can be repeatedly charged and discharged is in wide use as an electric storage device for these electronic devices.

Among the secondary batteries, the so-called rocking chair type lithium ion secondary battery is particularly in wide use as an electric storage device for such electronic devices as mentioned above because of the reasons as follows. The so-called rocking chair type lithium ion secondary battery uses as an active material a lithium-containing transition metal oxide such as lithium manganate or lithium cobaltate for a cathode and a carbon material into which lithium ions can be inserted and from which lithium ions are extracted for an anode so that while it is charged and discharged, the lithium ion concentration in the electrolytic solution does not substantially change. Thus, the rocking chair type lithium ion secondary battery needs electrolytic solution in an amount smaller than the so-called reserve type secondary battery. Such being the case, the rocking chair type lithium ion secondary battery can be downsized more readily than the reserve type secondary battery. Furthermore, the rocking chair type lithium ion secondary battery has a high energy density.

However, the lithium ion secondary battery is an electric storage device which obtains electric energy by electrochemical reactions. Thus, it has a material problem that it has a low power density because the rate of the electrochemical reactions is small. In addition, because the lithium ion secondary battery has a high internal resistance, it can be hardly charged and discharged rapidly.

Besides, as the lithium ion secondary battery contains a cathode active material having a large specific gravity, it leaves room for improvement of capacity density per unit weight, and on the other hand, as the electrode and electrolytic solution deteriorate due to electrochemical reactions when the battery is charged and discharged, it has an insufficient life, or cycle characteristics.

Under these circumstances, a nonaqueous electrolyte secondary battery in which a conductive polymer such as polyaniline having a dopant is used as a cathode active material is already known (see Patent Document 1).

However, in general, a nonaqueous electrolyte secondary battery which comprises a conductive polymer as a cathode active material cannot contribute to downsizing of a secondary battery. The reason is that because the nonaqueous electrolyte secondary battery which comprises a conductive polymer as a cathode active material is an anion-migrating type battery in which the conductive polymer is doped with anions when the battery is charged, and the anions are dedoped from the polymer when the battery is discharged, a rocking chair type secondary battery cannot be constructed when a carbon material is used as an anode active material into which lithium ions are inserted and from which lithium ions are extracted, and hence the battery needs a large amount of electrolytic solution.

In order to solve the problem mentioned above, a cation-migrating type secondary battery in which a cathode is formed of a conductive polymer having polymer anions such as polyvinylsulfonic acid as a dopant so that the ion concentration in the electrolytic solution remains substantially unchanged is proposed (see Patent Document 2). But the battery performance is not yet sufficient.

On the other hand, in recent years, a strategy for solving a problem of air pollution and, even a strategy for solving a problem of global warming, are earnestly studied. As one of the strategies, a hybrid vehicle and an electric vehicle have already reached a stage of practical use, and a lithium ion secondary battery has been put to practical use in part as an electric storage device for such vehicles.

However, although an electric storage device for hybrid or electric vehicles is required to have a high power density in particular when it is rapidly charged through a process of generative brake, or when a vehicle is accelerated, a lithium ion secondary battery has a high energy density, but it has a problem of low power density, as set out hereinbefore.

An electric double layer capacitor thus attracts attention. The electric double layer capacitor is an electric storage device which uses a polarizable electrode usually formed of a conductive and porous carbon material having a large specific surface area such as powder charcoal and fibrous charcoal, and which makes use of physical adsorption characteristics of supporting electrolyte ions in electrolytic solution. Therefore, the electric double layer capacitor has a high power density and is capable of being charged rapidly, and besides it has a very long life. However, on the other hand, as it has an energy density much smaller than a lithium ion secondary battery, it is problematic if the electric double layer capacitor can be put to practical use as an electric storage device for hybrid or electric vehicles.

For example, the electric double layer capacitor has a cycle life about 10-100 times longer, and a power density about 5 times larger, than a lithium ion secondary battery; however, the electric double layer capacitor has a weight energy density about $1/10$-$1/2$ as much as a lithium ion secondary battery, and a volume energy density about $1/50$-$1/20$ as much as a lithium ion secondary battery (see Patent Document 3).

PRIOR ART DOCUMENTS

Patent Documents

Patent Document 1: JP 3-129679 A
Patent Document 2: JP 1-132052 A
Patent Document 3: JP 2008-16446 A

SUMMARY OF THE INVENTION

Problems to be Solved by the Invention

The invention has been made to solve the above-mentioned problems involved in the conventional electric storage devices such as secondary batteries and electric double layer capacitors. Therefore, it is an object of the invention to provide a novel nonaqueous electrolyte secondary battery which is superior in weight power density and cycle characteristics like an electric double layer capacitor, and which has on the other hand a weight energy density much higher than that of conventional electric double layer capacitors. It is a further object of the invention to provide a cathode sheet for use in the nonaqueous electrolyte secondary battery mentioned above.

Means for Solving the Problems

The invention provides a nonaqueous electrolyte secondary battery having a cathode and an anode arranged so as to be opposite to each other, and an electrolyte layer put therebetween:
  wherein the cathode comprises:
    (a) a conductive polymer and
    (b) at least one selected from the group consisting of a polycarboxylic acid and a metal salt thereof, and
  wherein the anode comprises a material into which a base metal or ions thereof can be inserted and from which a base metal or ions thereof can be extracted.

The invention further provides a cathode sheet for use in the nonaqueous electrolyte secondary battery, which comprises a composite material comprising a collector and a layer of a cathode active material provided thereon,
  wherein the cathode active material comprises:
    (a) a conductive polymer and
    (b) at least one selected from the group consisting of a polycarboxylic acid and a metal salt thereof.

According to the invention, the nonaqueous electrolyte secondary battery is preferably a lithium secondary battery, and therefore the cathode sheet for use in the nonaqueous electrolyte secondary battery is preferably a cathode sheet for use in the lithium secondary battery.

Effect of the Invention

The nonaqueous electrolyte secondary battery of the invention is superior in weight power density and cycle characteristics as if it was an electric double layer capacitor, and besides it has a weight energy density much higher than that of conventional electric double layer capacitors. That is, the nonaqueous electrolyte secondary battery of the invention is a secondary battery having the performance like that of a capacitor.

Further, the nonaqueous electrolyte secondary battery of the invention which is obtained by using the cathode sheet of the invention as well as a material into which a base metal or ions thereof can be inserted and from which a base metal or ions thereof can be extracted as an anode is superior in weight power density and cycle characteristics like an electric double layer capacitor, and in addition, it has a weight energy density much higher than that of conventional electric double layer capacitors.

BRIEF EXPLANATION OF THE DRAWINGS

FIG. 19 is a graph showing the process of initial activation of an example of the lithium secondary battery of the invention of which cathode comprises a conductive polypyrrole having anthraquinone 2-sulfonate anions as a dopant;

FIG. 20 is a graph showing the rate characteristics of the above-mentioned lithium secondary battery of the invention;

EMBODIMENTS OF THE INVENTION

Figure 1:
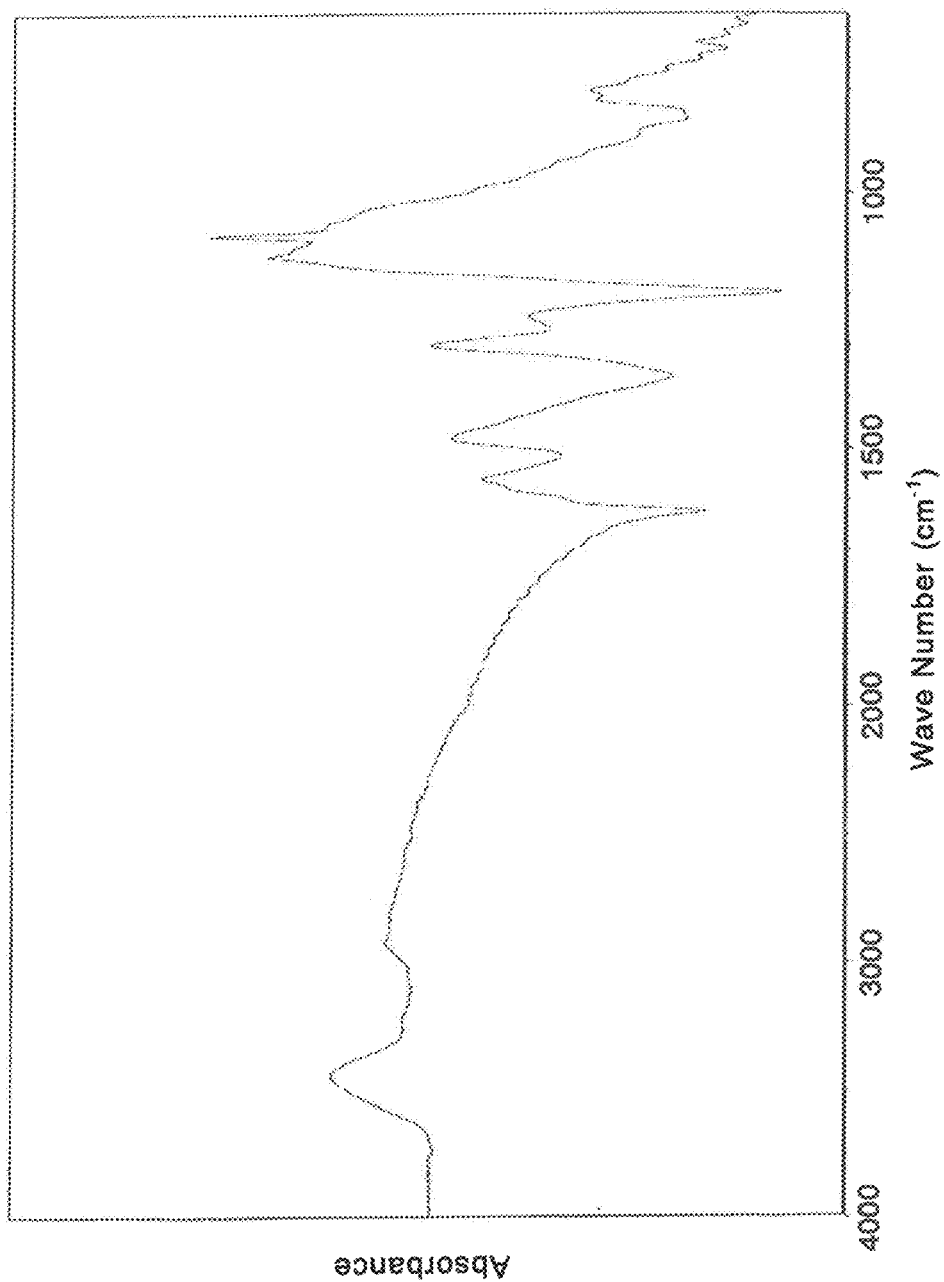
FIG. 1 is an FT-IR spectrum of conductive polyaniline powder having tetrafluoroborate anions as a dopant.

The nonaqueous electrolyte secondary battery of the invention has a cathode and an anode arranged so as to be opposite to each other, and an electrolyte layer put therebetween;

wherein the cathode comprises:
(a) a conductive polymer and
(b) at least one selected from the group consisting of a polycarboxylic acid and a metal salt thereof, and wherein the anode comprises a material into which a base metal or ions thereof can be inserted and from which a base metal or ions thereof can be extracted.

The cathode sheet of the invention for use in the nonaqueous electrolyte secondary battery comprises a composite material comprising a collector and a layer of a cathode active material provided thereon.

wherein the cathode active material comprises:
(a) a conductive polymer and
(b) at least one selected from the group consisting of a polycarboxylic acid and a metal salt thereof.

Herein the invention, the conductive polymer means a group of polymers such that they change their conductivity when ion species are inserted thereinto or ion species are extracted therefrom so that the change of electric charge generated or eliminated by oxidation reaction or reduction reaction of main chains of polymer is compensated. When ion species are inserted into a polymer, and as a result, the polymer has a high conductivity, then the polymer is said to be in a doped state, and when ion species are eliminated from a polymer, and as a result, the polymer has a low conductivity, then the polymer is said to be in a dedoped state.

If a conductive polymer loses its conductivity on account of oxidation or reduction reaction to become insulative (i.e., dedoped), the insulative polymer can reversibly become conductive again by oxidation/reduction reaction. Thus, herein the invention, such a polymer in an insulative state also falls under the category of conductive polymers.

Therefore, according to the invention, one of preferred conductive polymers is a polymer which has as a dopant at least one protonic acid anions selected from the group consisting of inorganic acid anions, aliphatic sulfonic acid anions, aromatic sulfonic acid anions, polymer sulfonic acid anions and polyvinylsulfuric acid anions. Another one of preferred conductive polymers is a polymer in a dedoped state which is obtained by dedoping the above-mentioned conductive polymer.

In the invention, the polycarboxylic acid is a polymer that has carboxylic groups in the molecule. The polycarboxylic acid is preferably at least one selected from the group consisting of polyacrylic acid, polymethacrylic acid, polyvinylbenzoic acid, polyallylbenzoic acid, polymethallylbenzoic acid, polymaleic acid, polyfumaric acid, polyglutaminic acid, polyaspartic acid, alginic acid, carboxymethylcellulose, and a copolymer comprising repeating units of at least two of the polymers listed herein. Herein the invention, the copolymer includes a graft copolymer.

In the invention, the metal salt of the polycarboxylic acid is at least one selected from the group consisting of an alkali metal salt and an alkaline earth metal salt. The alkali metal salt is preferably a lithium salt and a sodium salt, and the alkaline earth metal salt is preferably a magnesium salt and a calcium salt.

According to the invention, the polymer that provides a conductive polymer includes, for example, polypyrrole, polyaniline, polythiophene, polyfuran, polyselenophene, polyisothianaphthone, polyphenylenesulfide, polyphenyleneoxide, polyazulene, poly(3,4-ethylenedioxythiophene), polyacene, and various derivatives of these polymers. Among these polymers, one of preferred polymers is at least one selected from the group consisting of polyaniline and derivatives thereof because they have a large capacity per unit weight.

According to the invention, the polyaniline is a polymer obtained by electrochemical polymerization or by chemical oxidation polymerization of aniline, and the derivative of polyaniline is a polymer obtained by electrochemical polymerization or by chemical oxidation polymerization of a derivative of aniline. There may be mentioned as examples of the derivative of aniline, for example, an aniline which has at least one substituent selected from the group consisting of an alkyl group, an alkenyl groups, an alkoxy group, an aryl group, an aryloxy group, an alkyl aryl group, an aryl alkyl group, and an alkoxyalkyl group at a position except the 4-position of aniline.

Preferred examples of the derivative of aniline include o-substituted anilines such as o-methyl aniline, o-ethyl aniline, o-phenylaniline, o-methoxy-aniline, and o-ethoxyaniline, and m-substituted anilines such as m-methyl aniline, m-ethyl aniline, m-methoxy aniline, m-ethoxyaniline, and m-phenylaniline.

However, according to the invention, among the derivatives of aniline having a substituent at the 4-position, p-phenylaminoaniline can be exceptionally used as a derivative of aniline because it provides polyaniline by oxidation polymerization.

According to the invention, among the polymers that provide conductive polymers, a second preferred polymer is at least one selected from the group consisting of polypyrrole and derivatives thereof because their repeating unit has a formula weight as small as 65.08 so that they possibly have a high capacity density per unit weight.

In the invention, polypyrrole means a polymer obtained by chemical oxidation polymerization or electrochemical oxidation polymerization of pyrrole, and a derivative of polypyrrole means a polymer obtained by chemical oxidation polymerization or electrochemical oxidation polymerization of a derivative of pyrrole. There may be mentioned as examples of the derivative of pyrrole, for example, a pyrrole which has at least one substituent selected from the group consisting of an alkyl group, an alkenyl group, an alkoxy group, an aryl group, an aryloxy group, an alkyl aryl group, an aryl alkyl group, and an alkoxyalkyl group at a position except the 2- and 5-position.

Preferred examples of the derivatives of pyrrole include 3-methyl-pyrrole, 3-ethyl pyrrole, 3-ethenyl pyrrole, 3-methoxypyrrole, 3-ethoxypyrrole, 3-phenylpyrrole, 3-phenoxypyrrole, 3-p-toluoylpyrrole, 3-benzylpyrrole, 3-methoxymethylpyrrole, 3-p-fluorophenylpyrrole, 3,4-dimethylpyrrole, 3,4-diethylpyrrole, 3,4-diethenylpyrrole, 3,4-dimethoxypyrrole, 3,4-diethoxy-pyrrole, 3,4-diphenylpyrrole, 3,4-diphenoxypyrrole, 3,4-di(p-toluoyl)pyrrole, 3,4-dibenzylpyrrole, 3,4-dimethoxymethylpyrrole, and 3,4-di(p-fluorophenyl)-pyrrole.

In the following, "aniline or derivatives thereof" is simply referred to as "aniline", and "at least one selected from the group consisting of polyaniline and derivatives thereof" is simply referred to as to "polyaniline" unless otherwise specified. In the same manner, "pyrrole or derivatives thereof" is simply referred to as "pyrrole", and "at least one selected from the group consisting of polypyrrole and derivatives thereof" is simply referred to as "polypyrrole" in the following, unless otherwise specified. Therefore, if a polymer which provides conductive polymer is a derivative of aniline or pyrrole, the polymer may be simply referred to as "a conductive polyaniline" or "a conductive polypyrrole", respectively.

The conductive polyaniline can be obtained by electrochemical polymerization of aniline in the presence of a protonic acid or by chemical oxidation polymerization of aniline in the presence of a protonic acid using an oxidizing agent in an appropriate solvent, as well known, and preferably by chemical oxidation of aniline using an oxidizing agent. Water is usually used as the solvent, but a mixed solvent such as a mixture of water soluble organic solvent and water, or a mixture of water and a nonpolar organic solvent is also used. When these mixed solvents are used, a surfactant may be used if necessary.

Taking the chemical oxidation polymerization of aniline in water as an example, the production of conductive polyaniline is explained in more specifically. The chemical oxidation polymerization of aniline is carried out using a chemical oxidizing agent in the presence of a protonic acid in water. The chemical oxidizing agent may be either water soluble or water insoluble.

Preferred oxidizing agents include, for example, ammonium peroxodisulfate, hydrogen peroxide, potassium dichromate, potassium permanganate, sodium chlorate, cerium ammonium nitrate, sodium iodate, iron chloride, etc.

The amount of oxidizing agent used for oxidation of aniline has influence on the yield of the conductive polyaniline obtained. When aniline is to be reacted quantitatively, it is preferred to use an oxidizing agent in an amount 2.5/n times in moles as much as the amount of the aniline used wherein n is the number of electrons required for one molecule of the oxidizing agent to be reduced. Therefore, when ammonium peroxodisulfate is used, n is 2, as seen from the following equation:

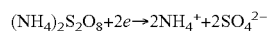

$$(NH_4)_2S_2O_8 + 2e \rightarrow 2NH_4^+ + 2SO_4^{2-}$$

However, in some cases, the oxidizing agent may be used in an amount a little less than 2.5/n times in moles as much as the amount of the aniline used, that is, in an amount of 30-80% of the amount 2.5/n times in moles as much as the amount of the aniline used, so that the aniline is prevented from being brought into peroxidative status.

In the production of polyaniline, the protonic acid is used so that the aniline makes a salt in water and is made soluble in water, and the polymerization system is kept strongly acidic at a pH of 1 or less, but also the resulting polyaniline is doped therewith thereby to be conductive. Accordingly, the amount of the protonic acid used is not limited so far as the above-mentioned purpose is accomplished, and it is usually 1.1 to 5 times in moles as much as the amount of the aniline used. However, a preferred amount is 1.1 to 2 times in moles as much as the amount of the aniline used because when the amount of the protonic acid is too much, the expense for waste treatment after oxidation polymerization of aniline increases to no purpose. Such being the case, the preferred protonic acid used is a strongly acidic one, and more specifically, such a protonic acid that has an acid dissociation constant pKa of less than 3.0.

As the protonic acid having such an acid dissociation constant pKa of lets than 3.0, there may be mentioned, for example, an inorganic acid such as sulfuric acid, hydrochloric acid, nitric acid, perchloric acid, tetrafluoroboric acid, hexafluorophosphoric acid, hydrofluoric acid, and hydroiodic acid, an aromatic sulfonic acid such as benzenesulfonic acid and p-toluenesulfonic acid, an aliphatic sulfonic acid (or an alkane sulfonic acid) such as methanesulfonic acid and ethanesulfonic acid.

A polymer having sulfonic acid groups in the molecule, that is, a polymer sulfonic acid, can be also used as a protonic acid. Such a polymer sulfonic acid includes, for example, polystyrenesulfonic acid, polyvinylsulfonic acid, polyallylsulfonic acid, poly(acrylic amide t-butylsulfonic acid), phenolsulfonic acid novolac resin, perfluorosulfonic acid represented by Nafion (registered trademark). In the invention, polyvinylsulfuric acid can also be used as a protonic acid.

In addition to the above-mentioned, a certain kind of phenols such as picric acid, a certain kind of aromatic carboxylic acids such as m-nitrobenzoic acid, and a certain kind of aliphatic carboxylic acids such as dichloroacetic acid and malonic acid can be also used as a protonic acid in the production of conductive polyaniline because these acids have also an acid dissociation constant pKa of less than 3.0.

Among the various protonic acids mentioned above, tetrafluoroboric acid and hexafluorophosphoric acid are protonic acids which contain the same anion species as an electrolyte or a salt of a base metal in a nonaqueous electrolytic solution in a nonaqueous electrolyte secondary battery. That is, in the case of lithium secondary battery, they are protonic acids which contain the same anion species as an electrolyte or a lithium salt in a nonaqueous electrolytic solution in a lithium secondary battery. Thus, they are preferably used as a protonic acid in the production of conductive polyaniline.

On the other hand, conductive polypyrrole is obtained by subjecting pyrrole to chemical oxidation polymerization by using a suitable chemical oxidizing agent in an aqueous solution of pyrrole containing an organic sulfonate such as sodium alkylbenzenesulfonate, e.g., sodium dodecylbenzenesulfonate and sodium anthraquinonesulfonate. Conductive polypyrrole is also obtained as thin film on an anode by subjecting pyrrole to electrochemical oxidation polymerization using a stainless steel electrode in an aqueous solution of pyrrole containing a sodium alkylbenzenesulfonate or an organic sulfonate.

In such a method for producing conductive polypyrrole as mentioned above, the sodium alkylbenzene-sulfonate and organic sulfonate act as an electrolyte, while alkylbenzenesulfonic acid anions and organic sulfonic acid anions function as a dopant of polypyrrole formed to provide polypyrrole with conductivity.

According to the invention, as set forth above, the conductive polymer may be a polymer doped with protonic acid anions, or may be a polymer in a dedoped state obtained by dedoping the above-mentioned polymer doped with protonic acid anions. If necessary, the polymer in dedoped state may be further reduced.

As a method for dedoping a conductive polymer, there may be mentioned a method in which, for example, a conductive polymer doped with a protonic acid is neutralized with an alkali. Also as a method for dedoping and then reducing a conductive polymer doped with a protonic acid, there may be mentioned a method in which, for example, a conductive polymer is dedoped by neutralization with an alkali, and the thus obtained dedoped polymer is reduced with a reducing agent.

In order to neutralize a conductive polymer doped with a protonic acid by use of an alkali, the polymer is put in an aqueous solution of alkali such as sodium hydroxide solution, potassium hydroxide solution, or ammonia water, and the resulting mixture is stirred at a room temperature, or at a temperature of 50-80° C. with heating, if necessary. When the mixture is treated with an alkali with heating in this way, the dedoping reaction of conductive polymer is accelerated, and the conductive polymer is dedoped within a short period of time.

On the other hand, in order to reduce a polymer thus dedoped, the dedoped polymer is put in a solution of reducing agent such as hydrazine monohydrate, phenylhydrazine/alcohol, sodium dithionite, or sodium sulfite, and the resulting mixture is stirred at a room temperature, or at a temperature of 50-80° C. with heating, if necessary.

The cathode sheet of nonaqueous electrolyte secondary battery of the invention comprises a composite sheet which comprises a current collector and a layer comprising a solid cathode active material and a conductive auxiliary agent wherein the solid cathode active material comprises such a conductive polymer set forth above and at least one selected from the group consisting of a polycarboxylic acid and a meta salt thereof. The layer comprising the cathode active material and the conductive auxiliary agent is porous. The polycarboxylic acid and a metal salt thereof were herein already set forth.

Taking a lithium secondary battery of which cathode comprises a conductive polyaniline as a conductive polymer as an example of preferred nonaqueous electrolyte secondary battery of the invention, the behavior of polyaniline when the battery is charged and discharged is explained with reference to the schemes 1 and 2 below.

The polyaniline obtained by dedoping a conductive polyaniline that is doped with protonic acid anions by treating with an alkali and then by reducing the resulting product with a reducing agent comprises imino-p-phenylene structural units shown as a formula (Ia). When a secondary battery of which cathode comprises a polyaniline which comprises such imino-p-phenylene structural units as stated above is charged, the following is assumed to occur. At least some of the nitrogen atoms of the polyaniline which have unpaired electrons are one-electron oxidized, and as a result, cation radicals are produced, and the anions such as electrolyte anions (e.g., tetrafluoroborate anions) in an electrolytic solution or polycarboxylic acid anions (i.e., polycarboxylate anions) in the electrode dope the polyaniline as counterions for the cations thereby to produce a doped conductive polyaniline (Ib) or (B).

On the other hand, when the lithium secondary battery is discharged, the cation radical sites in the above-mentioned conductive polyaniline (Ib) are reduced so that the conductive polyaniline returns to the original polyaniline (Ia) which has unshared electron pairs on the nitrogen atoms and is electrically neutral, as shown in a formula shown below, whereupon if the anions which are under coulomb interaction with the polyaniline in the above-mentioned cation radical sites are electrolyte anions (for example, tetrafluoroborate anions), the electrolyte anions migrate toward electrolyte from the neighborhood of the conductive polymer.

However, if the anions which are under coulomb interaction with the polyaniline in the above-mentioned cation radical sites are polycarboxylic acid, for example, carboxylate anions of polyacrylic acid (IIIb), as shown below, the carboxylate anions cannot migrate toward the electrolyte, unlikely the electrolyte anions (e.g., tetrafluoroborate anions), as they are polymeric anions, but they remain in the neighborhood of the polyaniline (IIa). Therefore, lithium cations migrate toward the neighborhood of the conductive polymer from the electrolytic solution to make the above-mentioned carboxylate anions electrically neutral, thereby to form salts (IIa) as countercations for the carboxylate anions.

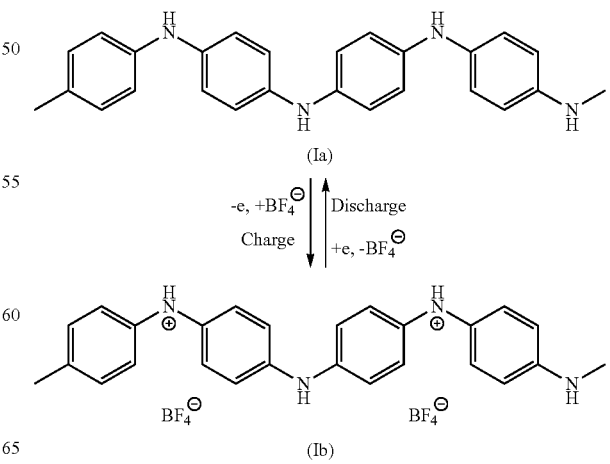

(Scheme 2)

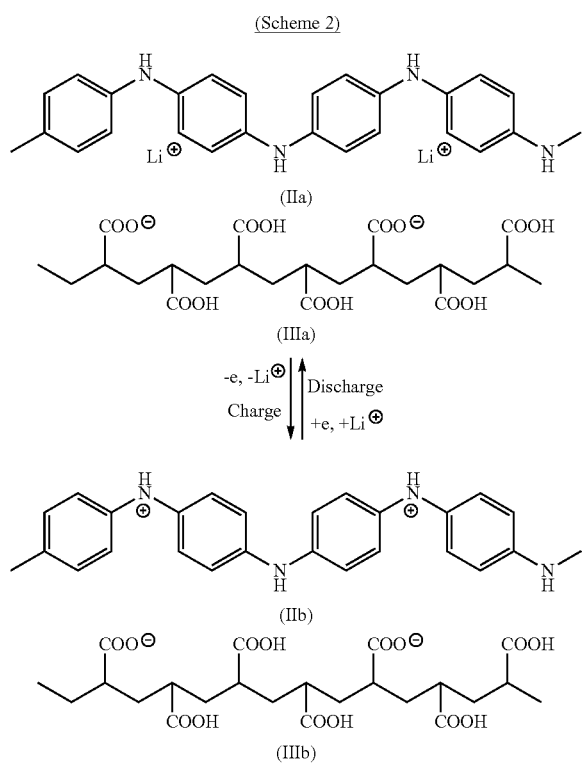

According to the invention, the cathode sheet of the invention for use in the nonaqueous electrolyte secondary battery comprises a composite sheet which comprises a current collector and a layer provided on the current collector, wherein the layer comprise a solid cathode active material comprising a conductive polymer and at least one selected from the group consisting of a polycarboxylic acid and a metal salt thereof, and a conductive auxiliary agent. The layer comprising the cathode active material and the conductive auxiliary agent is solid and porous.

The cathode sheet for use in the nonaqueous electrolyte secondary battery is obtained as follows. For example, the at least one selected from the group consisting of a polycarboxylic acid and a metal salt thereof is dissolved or dispersed in water; powder of a conductive polymer and, if necessary, a conductive auxiliary agent such as conductive carbon black, is added to the resulting solution or dispersion, and are fully dispersed therein, to prepare a high viscosity paste having a solution viscosity of about 0.05-50 Pa·s; the paste is coated on a current collector to form a layer of the paste; and then water is vaporized from the layer thereby to provide the cathode sheet in a form of a composite sheet which has on the current collector an even layer comprising a cathode active material comprising a conductive polymer and at least one selected from the group consisting of a polycarboxylic acid and a metal salt thereof, (and a conductive auxiliary agent, if necessary).

It is preferred that the conductive auxiliary agent is a conductive material which is superior in conductivity and is effective to reduce electrical resistance between the active materials of the electrodes, and further which does not change their properties depending upon electric potential applied when the battery is charged and discharged. As the conductive auxiliary agent are usually used conductive carbon black such as acetylene black and Ketjenblack, and fibrous carbon material such as carbon fiber, carbon nanotube, and carbon nanofiber.

In the nonaqueous electrolyte secondary battery of the invention, the polycarboxylic acid and a metal salt thereof have a function not only of a binder in the preparation of the cathode but also of a dopant of conductive polymer in the cathode, as set forth later, thereby to contribute to improvement of performance of the nonaqueous electrolyte secondary battery of the invention, although the invention is not limited to any theory.

In the nonaqueous electrolyte secondary battery of the invention, the at least one selected from a polycarboxylic acid and a metal salt thereof is used usually in an amount of 1 to 100 parts by weight, preferably in an amount of 2 to 50 parts by weight, more preferably in an amount of 5 to 30 parts by weight, per 100 parts by weight of a conductive polymer. When the amount of the at least one selected from a polycarboxylic acid and a metal salt thereof is too small in relation to the amount of the conductive polymer, a nonaqueous electrolyte secondary battery superior in weight power density cannot be obtained. When the amount of the at least one selected from a polycarboxylic acid and a metal salt thereof is too large in relation to the amount of the conductive polymer, a nonaqueous electrolyte secondary battery superior in weight energy density cannot be obtained because of increase in weight of members except the cathode active material, when taking the whole weight of the battery into consideration.

It is preferred that the porous layer of the cathode active material has a porosity in a range of 35 to 80% so that the it has a high performance as an electrode.

Further in the nonaqueous electrolyte secondary battery of the invention, the electrolyte layer is, for example, a sheet of separator which is impregnated with electrolytic solution, or a sheet formed of solid electrolyte. The sheet formed of solid electrolyte serves also as a separator.

As the electrolyte with which not only a separator but also electrodes are impregnated, there may be used, for example, a combination of a base metal ion with an appropriate counter ion for the base metal ion, for example, sulfonate ion, perchlorate ion, tetrafluoroborate ion, hexafluorophosphorate ion, hexafluoroarsenate ion, bis(trifluoromethanesulfonyl)imide ion, bis(pentafluoroethanesulfonyl)imide ion, and halogen ion.

According to the invention, the base metal refers to a metal which has an ionization tendency larger than hydrogen, and is readily oxidized in the air (when heated). An alkali metal such as lithium, sodium and potassium, and an alkaline earth metal such as magnesium and calcium, and aluminum, zinc, and lead belong to the base metal.

Therefore, examples of the electrolyte mentioned above include $LiCF_3SO_3$, $LiClO_4$, $LiBF_4$, $LiPF_6$, $LiAsF_6$, $LiN(SO_2CF_3)_2$, $LiN(SO_2C_2F_5)_2$, LiCl, $NaCF_3SO_3$, $NaClO_4$, $NaBF_4$, $NaPF_6$, $NaAsF_6$, $Ca(CF_3SO_3)_2$, $Ca(ClO_4)_2$, $Ca(BF_4)_2$, $Ca(PF)_2$, $Ca(AsF_6)_s$, and so on.

The solvent for nonaqueous electrolyte includes, for example, at least one nonaqueous solvent selected from the group consisting of a carbonate, a nitrile, an amide, and an ether, that is, an organic solvent. Such an organic solvent includes, for example, ethylene carbonate, propylene carbonate, butylene carbonate, dimethylcarbonate, diethylcarbonate, ethylmethyl-carbonate, acetonitrile, propionitrile, N,N'-dimethylacetamide, N-methyl-2-pyrrolidone, dimethoxyethane, diethoxyethane, and γ-butyrolactone.

When a separator is used in the nonaqueous electrolyte secondary battery of the invention, the separator is such that it is an insulative sheet which is capable of preventing electrical short circuit between a cathode and an anode which are arranged to be opposite to each other and between which the separator is sandwiched, and which is electrochemically stable, and has a large ion permeability, and in addition, has a mechanical strength to a certain degree. Therefore, paper, nonwoven fabric, and a porous film formed of a resin such as polypropylene, polyethylene, and polyimide is preferably used as a separator.

In the nonaqueous electrolyte secondary battery of the invention, as an anode is used a base metal or a material into which base metal ions are inserted and from which base metal ions are extracted in oxidation/reduction reactions. The base metal includes, for example, an alkali metal such as lithium or sodium metal, an alkaline earth metal such as magnesium or calcium metal, and the base metal ion includes, for example, ions of the base metals stated above.

According to the invention, a preferred nonaqueous electrolyte secondary battery is a lithium secondary battery. Accordingly, a preferred base metal is lithium, and preferred base metal ions are lithium ions. As a material into which base metal ions are inserted and from which base metal ions are extracted, a carbon material is preferably used, but silicon and tin are also used.

The nonaqueous electrolyte secondary battery of the invention is superior in weight power density and cycle characteristics like an electric double layer capacitor, and in addition, it has a weight energy density much higher than that of conventional electric double layer capacitors. Therefore, the nonaqueous electrolyte secondary battery of the invention can be said to be a capacitor-like secondary battery.

EXAMPLES

The invention will be explained in more detail with reference to examples below, but the invention is not limited at all by these examples.

In the following, the porosity P of the layer of the cathode active material of the cathode sheet was calculated by the following equation:

$$P=((ST-V)/ST)\times 100$$

in which S is an area ($cm^2$) of the cathode sheet; T is a thickness (cm) of the cathode sheet except the thickness of the current collector; and V is a volume ($cm^3$) of the cathode sheet except the volume of the current collector. The volume of the cathode sheet except the volume of current collector was calculated as follows. Using the proportion of the weight of the materials constituting the cathode sheet and the true density of each of the materials, an average density of the whole materials of the cathode sheet was calculated, and then the total weight of the materials of the cathode sheet was divided by the average density. The true densities of polyaniline, acetylene black (Denka Black) and polyacrylic acid are 1.2, 2.0 and 1.18, respectively.

Example 1

(Production of Conductive Polyaniline Powder Having Tetrafluoroborate Anions as a Dopant)

84.0 g (0.402 mol) of 42% by weight concentration aqueous solution of tetrafluoroboric acid (special grade; available from Wake Pure Chemical Industries, Ltd.) was put in 138 g of ion exchanged water in a 300 mL capacity glass beaker. While stirring with a magnetic stirrer, 10.0 g (0.107 mol) of aniline was added to the resulting solution. At first when the aniline was added to the aqueous solution of tetrafluoroboric acid, the aniline was found to be dispersed as oily droplets in the aqueous solution, and then within a few minutes the aniline was dissolved in water to provide an even and transparent aqueous solution of aniline. The aqueous solution of aniline obtained in this way was then cooled to a temperature of −4° C. or lower in a constant low temperature bath.

Then, 11.63 g (0.134 mol) of manganese dioxide powder (special grade; available from Wako Pure Chemical Industries. Ltd.), an oxidizing agent, was added to the aqueous solution of aniline in small portions while the temperature of the mixture in the beaker was prevented from exceeding −1° C. When the oxidizing agent was added to the aqueous solution of aniline in such a manner as mentioned above, the aqueous solution of aniline immediately turned dark green. When stirring was continued for a while, dark green solid began to be formed.

After the addition of oxidizing agent over a period of 80 minutes in this way, the reaction mixture containing the resulting reaction product was further stirred for 100 minutes while it was cooled. Then, the resulting solid was collected on No. 2 filter paper by suction filtration using a Buchner funnel and a suction bottle to obtain powder. The powder was stirred and washed in an aqueous solution of tetrafluoroboric acid having a concentration of about 2 mol/d $m^3$ using a magnetic stirrer, and then in acetone several times, followed by vacuum filtration. The obtained powder was vacuum dried at room temperature for ten hours thereby 12.5 g of conductive polyaniline having tetrafluoroborate anions as a dopant was obtained as bright green powder.

(Analysis of Conductive Polyaniline Powder)

FIG. 1 is an FT-IR spectrum of the conductive polyaniline powder obtained in this way. The adsorption peaks at 2918 $cm^{-1}$ are derived from C—H stretching vibration of benzene ring; 1559 and 1479 $cm^{-1}$ are from elongation stretching vibration of benzene ring; 1297 and 1242 $cm^{-1}$ are from C—N deformation vibration; and 1122 and 1084 $cm^{-1}$ are from tetrafluoroboric acid doping polyaniline.

Figure 2:
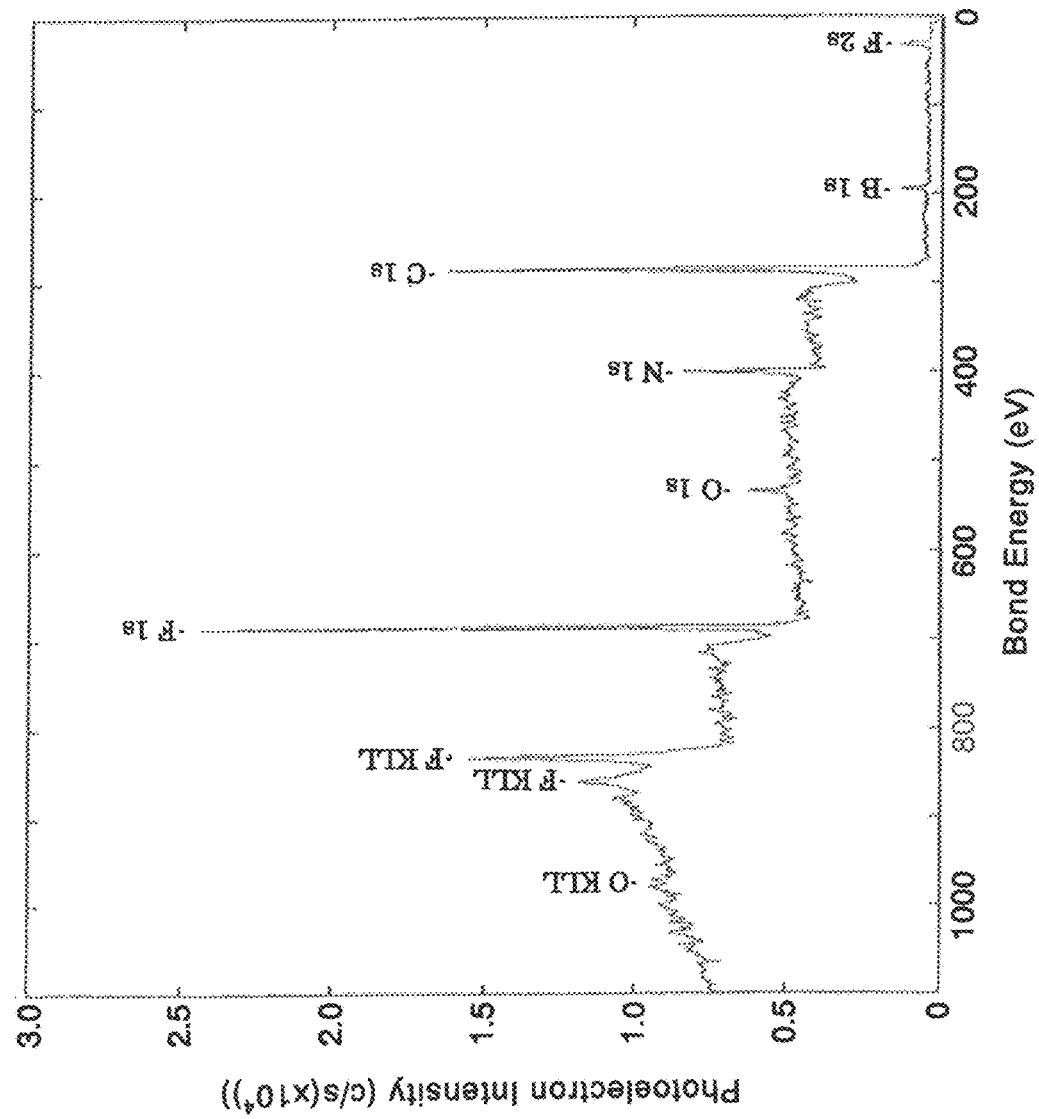
FIG. 2 is an ESCA spectrum (wide scan) of the above-mentioned conductive polyaniline powder.

FIG. 2 is wide scan data of ESCA (photoelectron spectroscopy) spectrum of the above-mentioned conductive polyaniline powder, in which carbon, oxygen, nitrogen, boron and fluorine were observed, but sulfur and manganese were not observed.

Based on the narrow scan data (not shown) of the ESCA spectrum of the above-mentioned conductive polyaniline powder, the ratio of the elements of the conductive polyaniline was obtained. Then, based on the ratio of the elements were obtained the ratio of 1/4 of the fluorine atoms to the nitrogen atoms in the conductive polyaniline as well as the ratio of the boron atoms to the nitrogen atoms in the conductive polyaniline. Namely, the doping ratios were obtained. As results, (F/4)/N was found to be 0.33, and B/N was found to be 0.35.

Figure 3:
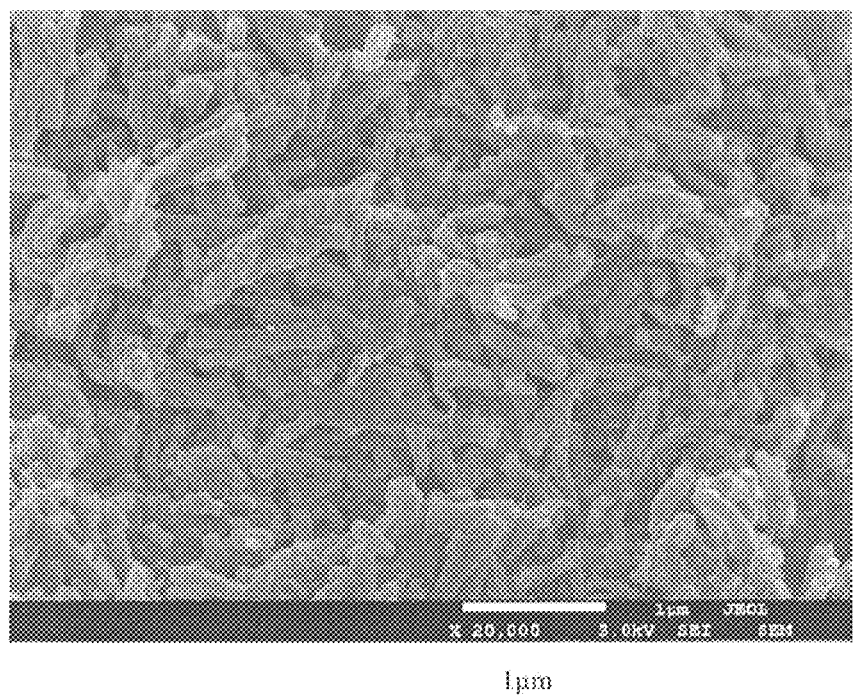
FIG. 3 is a scanning electron micrograph magnified 20000 times of the above-mentioned conductive polyaniline powder.

As FIG. 3 shows a scanning electron micrograph (SEM) magnified 20000 times, the conductive polyaniline powder was found to be agglomerates of stick-like particles about 0.1 μm in diameter.

(Conductivity of Conductive Polyaniline Powder)

130 mg of the above-mentioned conductive polyaniline powder was ground with an agate mortar. The resultant was subjected to vacuum press molding for ton minutes under a pressure of 300 MPa using a KBr tablet molding machine for infrared spectrum measurement to provide a disk of the conductive polyaniline having a thickness of 720 μm. The conductivity of the disk measured by four-terminal van der Pauw method was found to be 19.5 S/cm.

(Production of Cathode Sheet Comprising Conductive Polyaniline Powder)

0.1 g of polyacrylic acid (having a weight average molecular weight of 1,000,000; available from Wako Pure Chemical Industries, Ltd.) was added to 3.9 g of ion exchanged water, and left standing over night so that it swelled. Then, the polyacrylic acid was treated for one minute using a supersonic wave homogenizer to be dissolved in the ion exchanged water to provide 4 g of even and viscous aqueous solution of polyacrylic acid having a concentration of 2.5% by weight.

0.8 g of the conductive polyaniline powder was mixed with 0.1 g of conductive carbon black powder (Denka Black; available from Denki Kagaku Kogyo K.K.). The mixture was added to 4 g of the aqueous solution of polyacrylic acid and kneaded with a spatula, followed by treating the mixture using a supersonic wave homogenizer to provide a fluid paste. The paste was then defoamed using a vacuum bottle and a rotary pump.

The defoamed paste was coated on a sheet of etched aluminum foil for electric double layer capacitors (30CB; available from Hohsen Corporation) at a coating rate of 10 mm/s with a micrometer-provided doctor blade applicator using an automatic desk application device manufactured by Tester Sangyo K.K. After left standing for 45 minutes at room temperature, the layer of the paste on the foil was dried on a hot plate at a temperature of 100° C. The resulting product was then pressed between a pair of stainless steel plates 15 cm square at a temperature of 140° C. under a pressure of 1.49 MPa for five minutes using a vacuum press (KVHC manufactured by Kitagawa Seiki K.K.) to provide a composite sheet.

The composite sheet thus obtained had a cathode active material which comprised the polyacrylic acid, the conductive polyaniline powder and the conductive carbon black powder and which was found to have a porosity of 55%.

A disk was punched out from the composite sheet using a punching jig having a punching blade 15.95 mm in diameter to provide a cathode sheet. Metal lithium (coin-shaped metal lithium; available from Honjo Kinsoku K.K.) was used as an anode, while nonwoven fabric TF40-50 manufactured by Hohsen Corporation and having a porosity of 68% was used as a separator. These members were incorporated in a stainless steel HS cell for experimental nonaqueous electrolyte secondary battery available from Hohsen Corporation K.K. The cathode sheet and the separator was vacuum dried at a temperature of 100° C. for five hours in a vacuum dryer before they were incorporated in the HS cell. The electrolyte was a 1 mol/dm$^3$ solution of lithium tetrafluoroborate ($LIBF_4$) in ethylene carbonate/dimethyl carbonate (available from Kishida Kagaku K.K.). A lithium secondary battery was assembled in a glove box having a dew point of −100° C. in an atmosphere of super high purity argon gas.

The performance of the thus assembled lithium secondary battery was evaluated in a constant current-current voltage charge/constant current discharge mode using a current charge/discharge device (SD8 manufactured by Hokuto Denko K.K.). Unless otherwise specified, the lithium secondary battery was charged at a constant current with the final charging voltage of 3.8 V, and after the voltage reached 3.8 V, the lithium secondary battery was charged at a constant voltage of 3.8 V until the current value reached 20% of the current value when being charged at the constant current, followed by discharging at a constant current to the final discharging voltage of 2.0 V.

Figure 4:
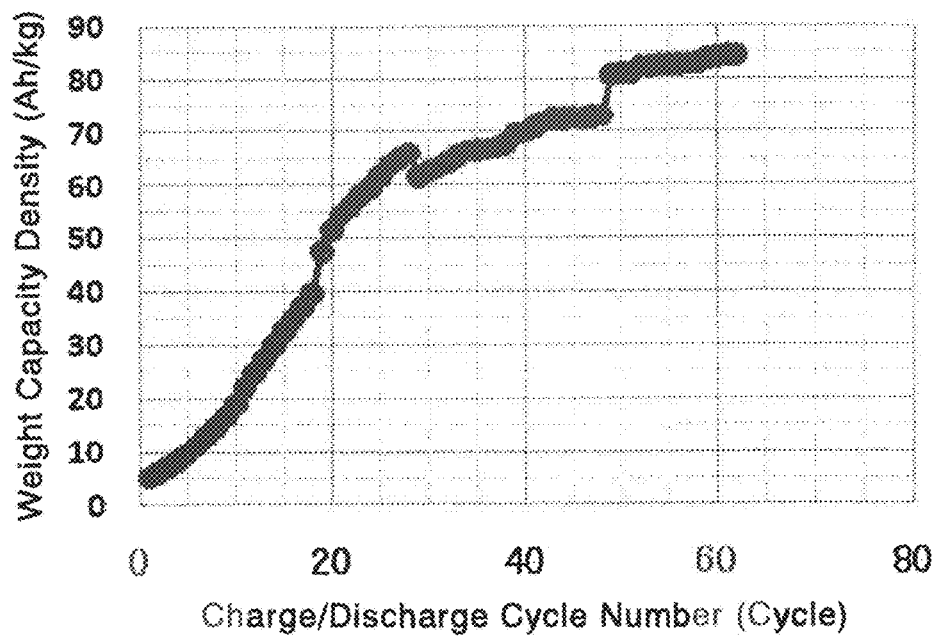
FIG. 4 is a graph showing the relation between the cycle number and weight capacity density obtained when an example of the lithium secondary battery of the invention of which cathode comprises a conductive polyaniline having tetrafluoroborate anions as a dopant is charged and discharged.
Figure 5:
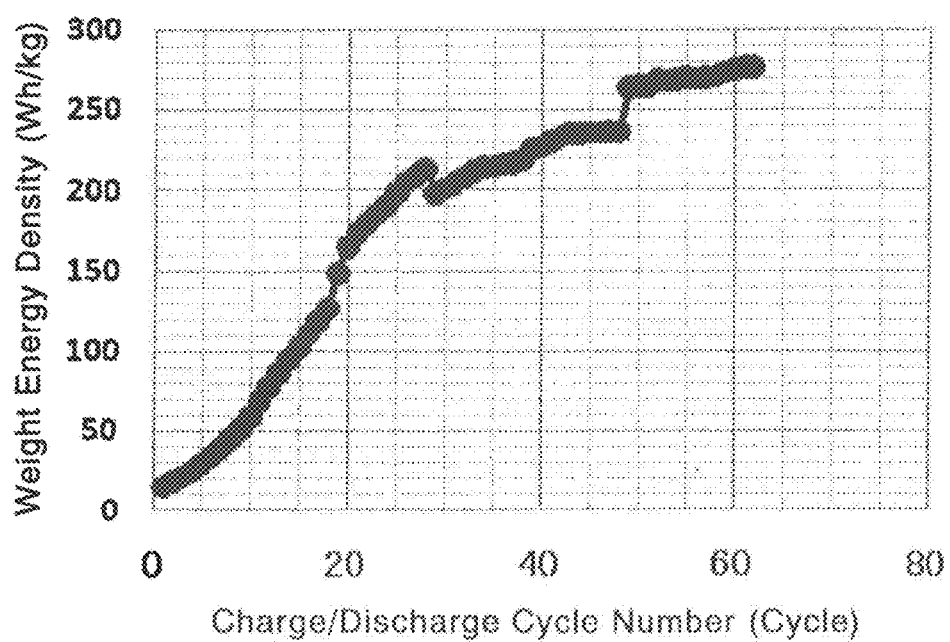
FIG. 5 is a graph showing the relation between the cycle number and weight energy density obtained when the above-mentioned example of the lithium secondary battery of the invention is charged and discharged.

The results obtained when the lithium secondary battery was subjected to charge/discharge cycle test at a charge/discharge current of 0.1 mA (except the period of the 29th to the 48th cycle in which the charge/discharge current was 0.2 mA) were shown in FIG. 4 and FIG. 5.

FIG. 4 shows the relation between charge/discharge cycle number and weight capacity density, and FIG. 5 shows the relation between cycle number and weight energy density.

As clear from FIG. 4 and FIG. 5, both the weight capacity density and the weight energy density of the lithium secondary battery of the invention increased as the cycle number increased, and at the 62nd cycle they reached a maximum, whereupon the weight capacity density was found to be 84.6 Ah/kg and the weight energy density was found to be 277 Wh/kg.

The rate characteristics of the lithium secondary battery were then evaluated. The weight capacity density, weight energy density, and weight power density were measured as the charge/discharge rate was changed from 0.5 C to 110 C. The results are shown in TABLE 1. The rate characteristics are those per the weight of cathode active material, that is, per the net weight of conductive polyaniline having tetrafluoroborate anions as a dopant.

TABLE 1

| | Cathode Weight Basis | | |
|---|---|---|---|
| Charge/Discharge Rate (C) | Weight Capacity Density (Ah/kg) | Weight Energy Density (Wh/kg) | Weight Power Density (W/kg) |
| 0.5 | 79.0 | 261.5 | 142 |
| 1.1 | 74.6 | 242.7 | 283 |
| 5 | 68.0 | 217.8 | 1394 |
| 11 | 65.0 | 205.6 | 2752 |
| 27 | 60.3 | 185.1 | 6669 |
| 54 | 54.3 | 160.6 | 12803 |
| 110 | 45.6 | 129.1 | 24316 |

As well known, when a total capacity of X (mAh) of a battery is discharged in an hour, the current value is X (mA), and the discharge rate is 1 C. The C is an initial of "capacity". Accordingly, when charge/discharge is carried out at a rate of 2 C, the current value is 2 X (mA), and the charge/discharge finishes in ½ hour, i.e., 30 minutes. On the other hand, when charge/discharge is carried out at a rate of 10 C, the current value is 10 X (mA), and the charge/discharge finishes in 1/10 hour. i.e., 6 minutes.

Thus, a battery which can be charged and discharged at a large value of C has a large battery output, and it is capable of being charged and discharged rapidly. As clear from TABLE 1, the lithium secondary battery assembled in Example 1 is a battery which has a very high output performance because it can be charged and discharged at a rate as high as 100 C or more.

Figure 6:
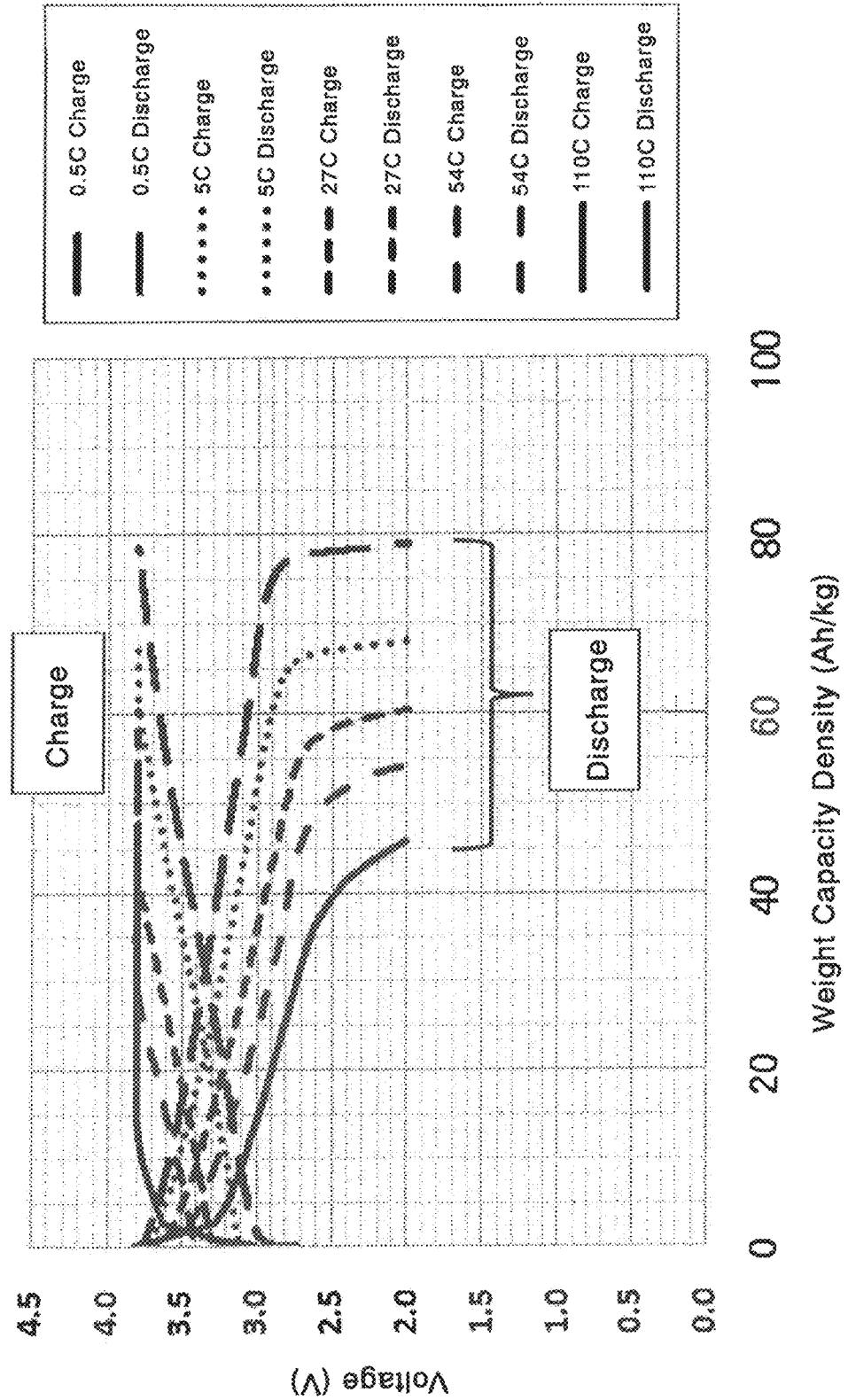
FIG. 6 is a graph (charge/discharge curve) showing the relation between the weight capacity density and voltage obtained when the above-mentioned example of the lithium secondary battery of the invention is charged and discharged at various rates.

FIG. 6 is a graph (charge/discharge curve) showing the relation between the weight capacity density and voltage obtained when the lithium secondary battery was charged and discharged at various rates in a range from 0.5 C to 110 C as shown in TABLE 1. Although the current value was changed from 0.5 C to 110 C, that is, 220 times as much as 0.5 C, the capacity was found to decrease from 79 Ah/kg to 45.6 Ah/kg, that is, to about 60% what it was, showing that the lithium secondary battery assembled in Example 1 is remarkably superior in output characteristics. A conventionally known lithium ion secondary battery would suffer remarkable decrease in capacity when the rate would reach about 3 C.

As stated above, the lithium secondary battery provided with a cathode sheet comprising a polyacrylic acid and a conductive polyaniline according to the invention has a high weight power density and superior cycle characteristics like a capacitor and, besides, it has a weight energy density 10 or more times higher than a capacitor.

Figure 7:
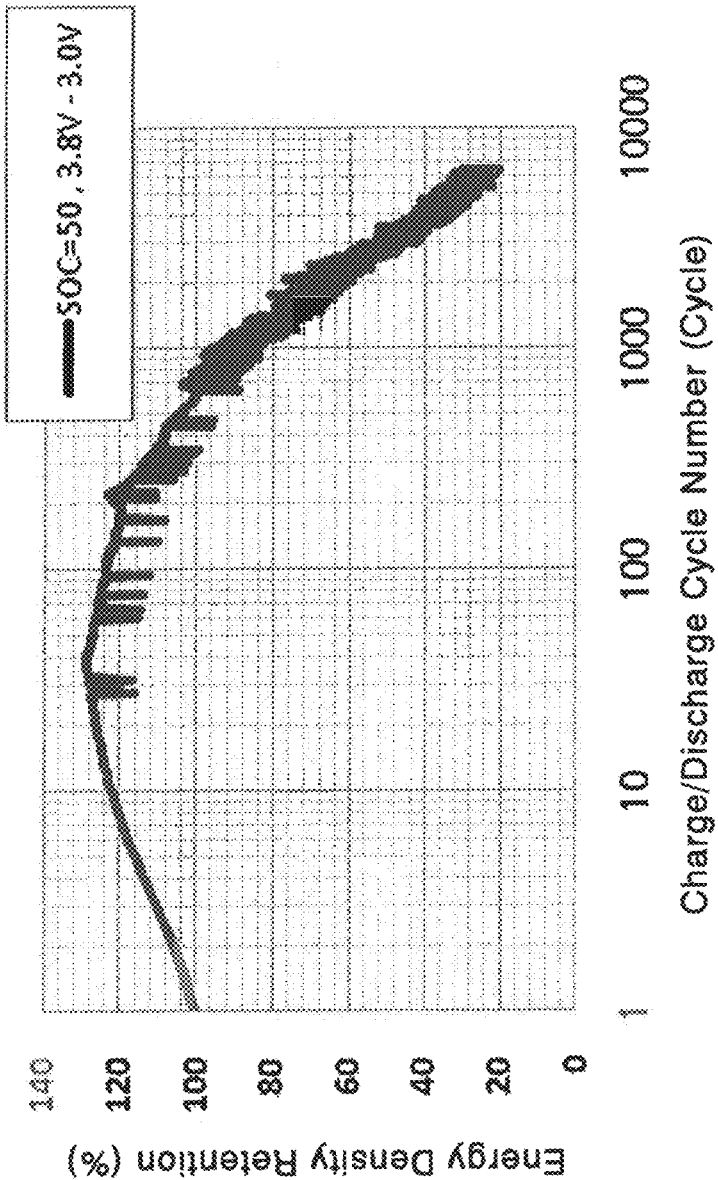
FIG. 7 is a graph showing the relation between the charge/discharge cycles and energy density retention obtained when the above-mentioned example of the lithium secondary battery of the invention is charged and discharged at a rate as high as 8.3 C.

FIG. 7 shows cycle characteristics obtained when the lithium secondary battery was discharged at a rate as high as 8.3 C up to 6454 cycles. The lithium secondary battery was charged at a constant current with the final charging voltage of 3.8 V, and after the voltage reached 3.8 V, the lithium secondary battery was charged at a constant voltage until the current value reached 20% of the current value when being charged at the constant current, followed by discharging at a constant current to the final discharging voltage of 3.0 V.

As a result, the lithium secondary battery was found to retain 90% of the initial weight energy density at the 1000th cycle, and 50% of the initial weight energy density even at the 3000th cycle, showing that the lithium secondary battery of the invention has a remarkably superior high cycle characteristics as compared with commonly known lithium ion batteries.

Comparative Example 1

A lithium secondary battery was assembled in the same manner as in Example 1 except that polyacrylic acid was not used, but conductive polyaniline powder obtained in Example 1 was used as it was. That is, a metal lithium anode and a separator were incorporated in a HS cell available from Hohsen Corporation K.K. After the separator was wetted with the electrolytic solution, a predetermined amount of the conductive polyaniline powder was adhered on the separator to assemble the battery.

Figure 8:
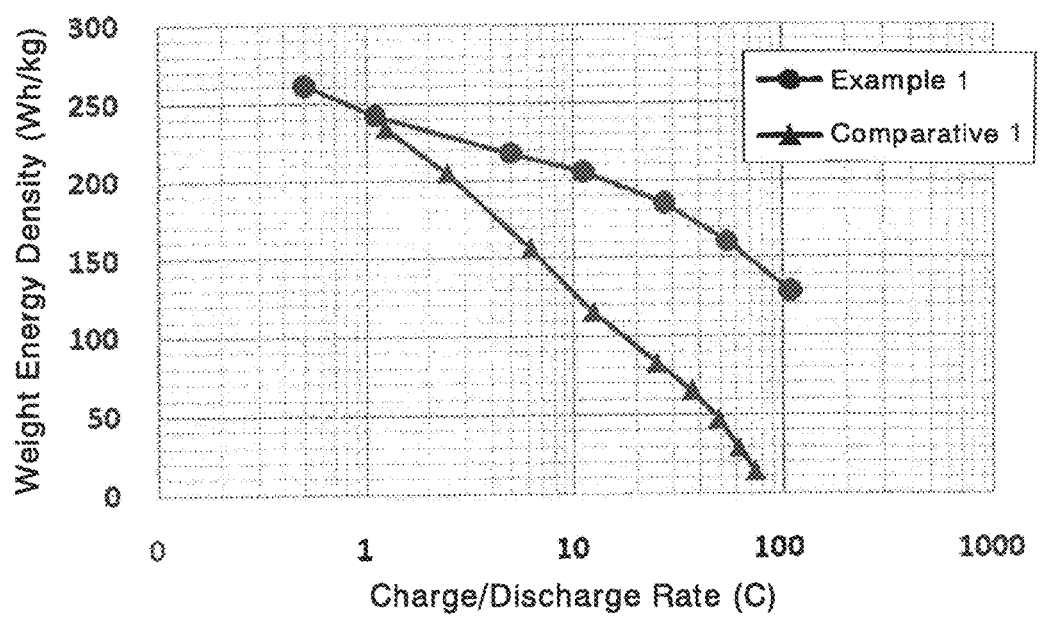
FIG. 8 is a graph showing the relation between the charge/discharge rate and weight energy density of the above-mentioned example of the lithium secondary battery of the invention and a lithium secondary battery as a comparative example.

TABLE 2 shows the relation between the charge/discharge rate and weight energy density as well as the weight power density of the lithium secondary battery thus obtained. FIG. 8 also shows the relation between charge/discharge rates and weight energy density of the lithium secondary battery thus obtained together with the rate characteristics of the lithium secondary battery assembled in Example 1.

TABLE 2

| Charge/Discharge Rate (C) | Weight Energy Density (Wh/kg) | Weight Power Density (W/kg) |
|---|---|---|
| 1.2 | 234.0 | 339 |
| 2.5 | 204.9 | 663 |
| 6.1 | 156.4 | 1570 |
| 12.3 | 116.1 | 2920 |
| 24.5 | 83.1 | 5422 |
| 36.8 | 65.9 | 7750 |
| 49.1 | 47.6 | 9835 |
| 61.3 | 29.5 | 11705 |
| 73.6 | 14.3 | 13299 |

The lithium secondary battery obtained in Comparative Example 1 was found to have a lower weight energy density over a whole range measured as compared with the lithium secondary battery obtained in Example 1.

Example 2

Except the use of a hard carbon electrode which was prepared by pre-doping of hard carbon, that is, a low crystalline carbon material available from Air Water K.K., with lithium, as an anode, in place of metal lithium, and otherwise in the same manner as in Example 1, a battery was assembled.

In a glove box, a lithium metal plate punched out so as to have a diameter of 15.5 mm was incorporated in the same HS cell as that mentioned hereinbefore, and a separator made of nonwoven fabric was layered on the lithium metal plate. 100 μL of an electrolytic solution, i.e., 1 mol/dm$^3$ solution of lithium tetrafluoroborate (LIBF$_4$) in ethylene carbonate/dimethyl carbonate was poured into the HS cell, and then a hard carbon electrode punched out so as to have a diameter of 15.95 mm was incorporated in the cell to provide a lithium secondary battery.

The thus assembled lithium secondary battery was taken out of the glove box, and a working electrode of a potentio/galvanostat (HZ-5000 manufactured by Hokuto Denko K.K.) was connected to the carbon electrode, and a counter electrode and reference electrode to the lithium metal electrode. The spontaneous potential was found to be about 3 V.

While the working electrode was reduced at a constant current of 1 mA, the electric potential of the working electrode gradually decreased to reach 0.17 V. The constant current charging was continued for further one hour to pro-dope the hard carbon electrode with lithium. Then, when the battery was discharged at a constant current of 1 mA, the capacity was found to be 195 mAh/g. After lithium pre-doping was carried out again at a constant current of 1 mA, the HS cell was placed again in the glove box, and was broken up to take out the carbon electrode therefrom.

Figure 9:
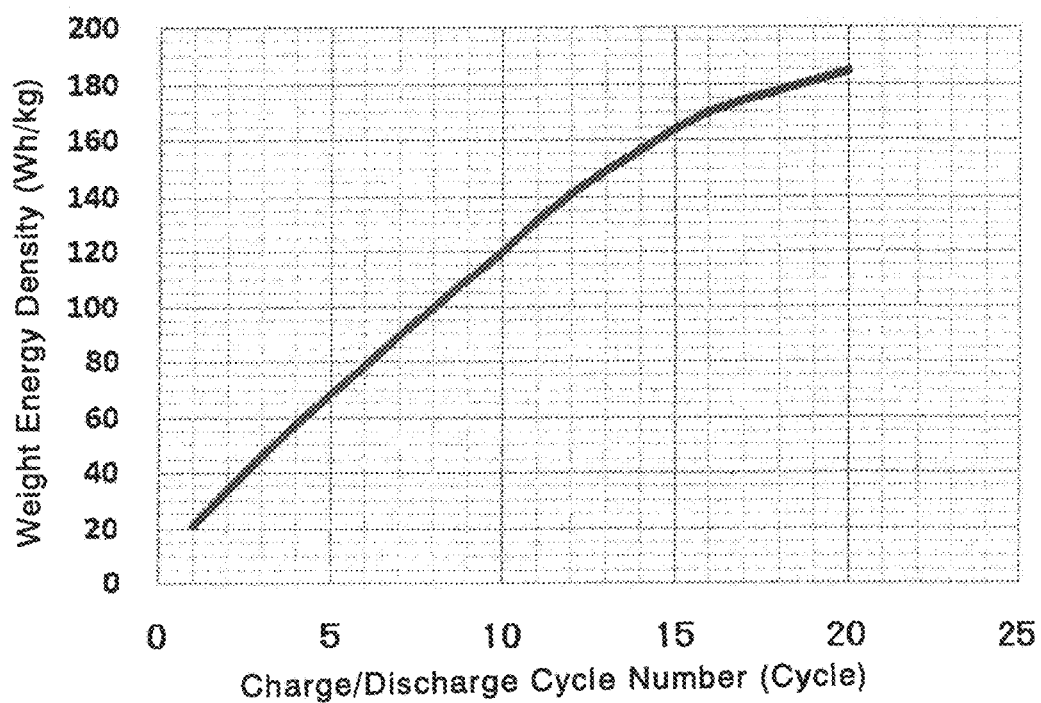
FIG. 9 is a graph showing the relation between the cycle number and weight capacity density obtained when a second example of the lithium secondary battery of the invention of which cathode comprises a conductive polyaniline having tetrafluoroborate anions as a dopant is charged and discharged.

The lithium secondary battery was assembled by using the hard carbon electrode pre-doped with lithium as an anode and a cathode which was prepared in the same manner as Example 1. As shown in FIG. 9, the battery reached a high weight energy density of 165 Wh/kg at 15th cycle, at a shorter cycle than in Example 1.

Example 3

(Production of Polyaniline Powder in a Reduced and Dedoped State)

The production of conductive polyaniline was carried out at a scale 10 times larger than in Example 1 to provide conductive polyaniline powder having tetrafluoroborate anions as a dopant as dark green powder.

The thus obtained conductive polyaniline powder in a dedoped state was added to a 2 mol/dm$^3$ aqueous solution of sodium hydroxide, and the mixture was stirred for 30 minutes to neutralize the conductive polyaniline, thereby dedoping the tetrafluoroborate anions, the dopant of the polyaniline, from the polyaniline.

The thus dedoped polyaniline was washed with water until the filtrate became neutral, stirred and washed in acetone, subjected to filtration using a Buchner funnel and a suction bottle thereby the dedoped polyaniline powder was collected on No. 2 filter paper. The dedoped polyaniline was vacuum dried for 10 hours at a room temperature to provide dedoped polyaniline as brown powder.

The thus obtained polyaniline powder in a dedoped state was put in an aqueous methanol solution of phenylhydrazine, and stirred and reduced for 30 minutes, whereupon the color of the polyaniline powder tuned gray from brown.

Figure 10:
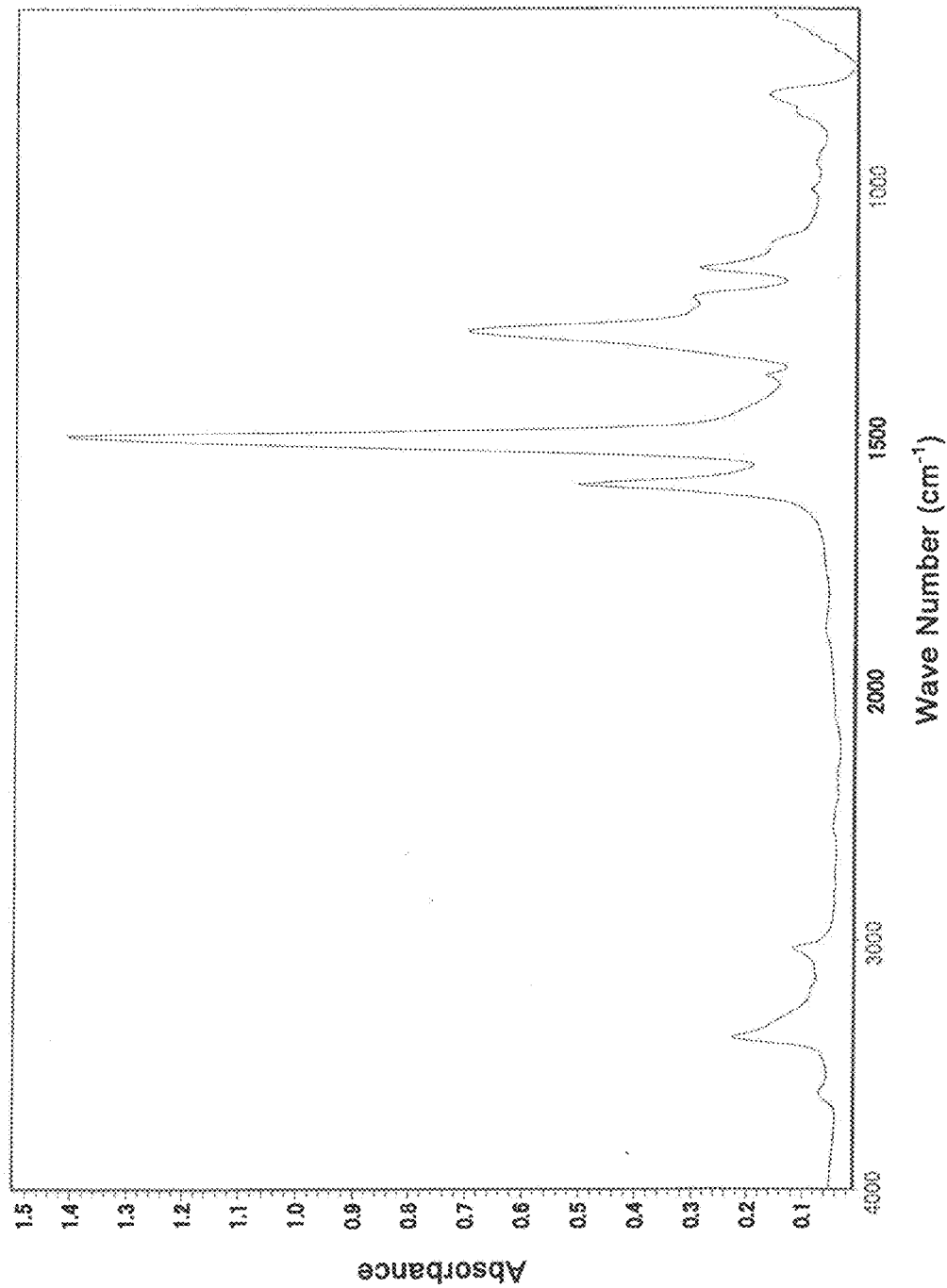
FIG. 10 is an FT-IR spectrum of reduced and dedoped polyaniline powder obtained by neutralizing a conductive polyaniline having tetrafluoroborate anions as a dopant, and then by reducing the resulting polyaniline.

After the reduction treatment set forth above, the resulting polyaniline powder was washed with methanol, and then with acetone, followed by collecting by filtration, and vacuum drying at a room temperature, to provide polyaniline powder in a reduced and dedoped state. FIG. 10 is an FT-IR spectrum of the polyaniline powder (KBr disk) in a reduced and dedoped state.

0.73 g of lithium hydroxide powder was added to 100 g of 4% by weight concentration aqueous solution of polyacrylic acid to prepare an aqueous solution of polyacrylic acid half lithium salt in which the half of the carboxyl groups that the polyacrylic acid initially possessed were in the form of lithium salts.

4.0 g of the polyaniline powder in a reduced and dedoped state was mixed with 0.5 g of conductive carbon black powder (Denka Black; available from Denki Kagaku Kogyo K.K.). The resulting mixture was added to 20.4 g of aqueous solution of the polyacrylic acid half lithium salt and was dispersed therein using a supersonic wave homogenizer to prepare a dispersion. The dispersion was further subjected to mild dispersion treatment with a high shearing force using a dispersing machine, Filmix (registered trademark) Model 40-40 (manufactured by Primix Corporation) to obtain a fluid paste. The paste was defoamed using a vacuum bottle and a rotary pump.

The paste was coated on a sheet of etched aluminum foil for electric double layer capacitors (30CB; available from Hohsen Corporation) at a coating rate of 10 mm/s with a micrometer-provided doctor blade applicator using an automatic desk application device manufactured by Tester Sangyo K.K. After left standing for 45 minutes at room temperature, the layer of the paste on the foil was dried on a hot plate at a temperature of 100° C. The resulting product was then pressed between a pair of stainless steel plates 15 cm square at a temperature of 140° C. under a pressure of 1.49 MPa for five minutes using a vacuum press (KVHC manufactured by Kitagawa Seiki K.K.) to provide a composite sheet. The composite sheet thus obtained had a cathode active material which was comprised of polyacrylic acid half lithium salt, conductive polyaniline powder and conductive carbon black and which was found to have a porosity of 71%.

Figure 11:
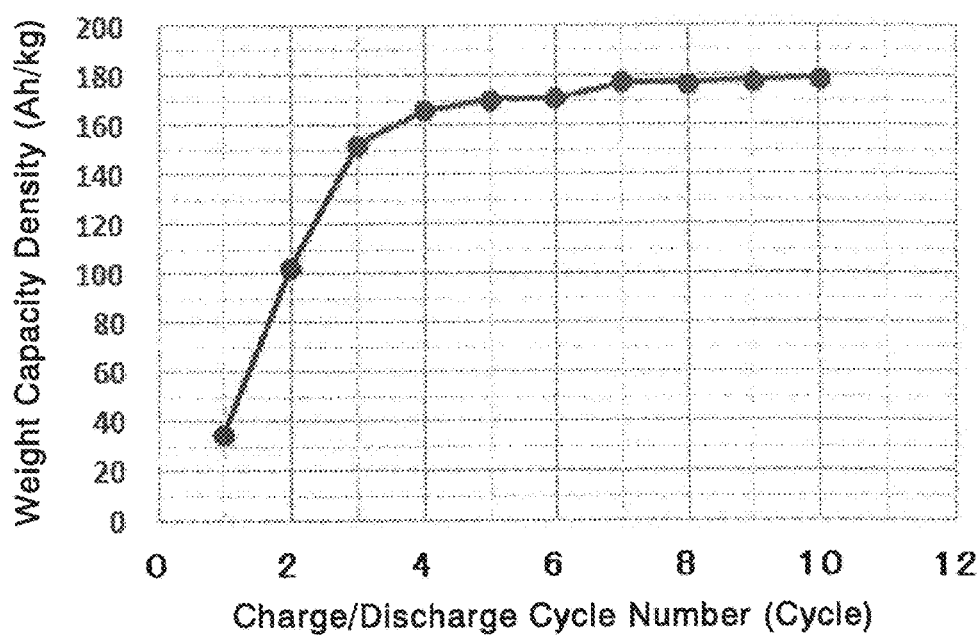
FIG. 11 is a graph showing the relation between the cycle number and weight capacity density obtained when an example of the lithium secondary battery of the invention of which cathode comprises the reduced and dedoped polyaniline powder mentioned above is charged and discharged.
Figure 12:
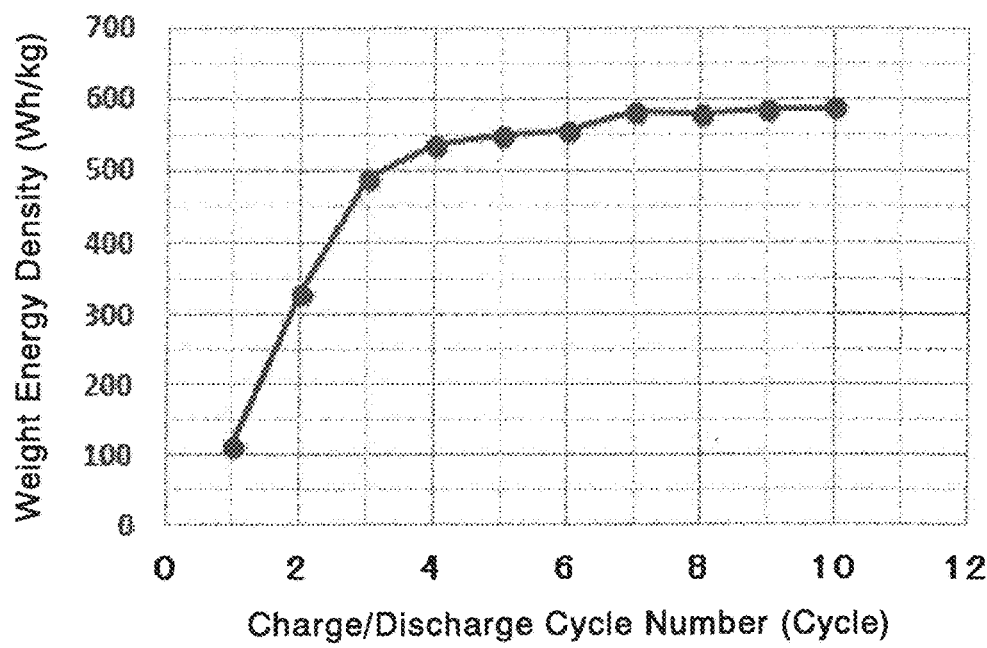
FIG. 12 is a graph showing the relation between the cycle number and weight energy density obtained when the above-mentioned example of the lithium secondary battery of the invention is charged and discharged.

A disk was punched out from the composite sheet using a punching jig having a punching blade 15.95 mm in diameter to prepare a cathode sheet. This cathode sheet was incorporated in an HS cell to assemble a lithium secondary battery, and the performance of the battery was evaluated in the same manner as Example 1. FIG. 11 shows the relation of the weight capacity density vs. the charge/discharge cycle number, and FIG. 12 shows the relation of the weight energy density vs. the charge/discharge cycle number.

Thus, as compared with the lithium secondary battery provided with a cathode active material comprising conductive polyaniline powder which had tetrafluoroborate anions as a dopant and was in a doped state and polyacrylic acid mentioned hereinbefore, the performance of which are shown in FIG. 4 and FIG. 5, the lithium secondary battery provided with a cathode active material comprising polyaniline powder in a reduced and dedoped state and polyacrylic acid half lithium salt was found to have a weight capacity density and a weight energy density each about twice higher than the former battery in relation to the charge/discharge cycle number.

As a polyaniline in a reduced and dedoped polyaniline was used in this example, the weight capacity density and the weight energy density were calculated by using only the weight of polyaniline which was in a reduced and dedoped state, and had no dopant.

Examples 4-19

Production of polyaniline powder used in these examples 4-19 is set forth below, and ODIs (i.e., oxidation degree indexes) of these polyanilines are shown in TABLE 3.

The polyaniline powder used in these examples was produced as follows. The powder of conductive polyaniline which was doped with tetrafluoroborate anions and was obtained in Example 1 was added to a 2 mol/dm$^3$ solution of sodium hydroxide, the resulting was stirred with a magnetic stirrer for 30 minutes, washed with water and then with acetone, and the resulting neutralized product was vacuum dried at a room temperature, thereby polyaniline in a dedoped state was obtained.

About 0.5 mg of the polyaniline in a dedoped state was dissolved in 200 mL of N-methyl-2-pyrrolidone (NMP) to obtain a blue solution. The solution was put in a quartz cell having a light path length of 1 cm, and the electronic spectrum was measured from ultraviolet to visible region using a recording spectrophotometer. The electronic spectrum obtained was found to have two absorption maximums at wavelengths of 340 nm and 640 nm. As shown in a formula below, the absorption at 340 nm is assigned to an amine structure (IVb) of the polyaniline while the absorption at 640 nm is assigned to a quinonediimine structure (IVa) of the polyaniline.

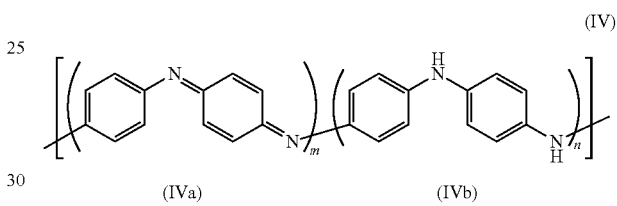

(IV)

(IVa)        (IVb)

Herein the invention, an ODI of polyaniline is defined to be a ratio of the absorbance $A_{640}$ of the absorption maximum at 640 nm assigned to the quinonediimine structure to the absorbance $A_{340}$ of the absorption maximum at 340 nm assigned to the amine structure, or a ratio of $A_{640}/A_{340}$. Therefore, the ODI is an index to show a ratio of the quinonediimine structure of polyaniline, that is, a ratio of oxidized state of polyaniline.

The larger the value of ODI, the higher the oxidation degree of polyaniline, while the smaller the value of ODI, the lower the oxidation degree of polyaniline, that is, the polyaniline is in a more reduced state. When polyaniline has been completely reduced, and has no quinonediimine structure, but is composed only of the amine structure, the value of $A_{640}$ is zero, and hence the polyaniline has an ODI of zero.

The above-mentioned conductive polyaniline powder having tetrafluoroborate anions as a dopant was treated with a 2 mol/d m$^3$ aqueous solution of sodium hydroxide, washed with water and then with acetone, and vacuum dried. The resulting polyaniline in a dedoped state was found to have an ODI of 0.87.

A polyacrylic acid having a weight average molecular weight of 1,000,000 and a polyacrylic acid having a weight average molecular weight of 25,000 were respectively dissolved in water or isopropanol (IPA) to prepare solutions of polyacrylic acid each having a concentration shown in TABLE 3. Then, sodium hydroxide was added to and dissolved in each of the solutions in an amount shown in TABLE 4 to prepare binder solutions. The solutions are hereinafter referred to as polyacrylic acid (lithium salt) solutions.

The polyaniline powder which was obtained in such a manner as mentioned hereinbefore and was in a reduced and dedoped state was mixed with the conductive carbon black (Denka Black; available from Denki Kagaku Kogyo K.K.) each in an amount shown in TABLE 3, and the resulting mixture was added to the polyacrylic acid (lithium salt) solution, followed by subjecting to dispersion treatment using a supersonic wave homogenizer. When the resulting mixture has a high viscosity, it was diluted with a diluent in an amount as shown in TABLE 4 so that it had a viscosity suitable for the following treatment using a dispersing machine, Filmix (registered trademark). When it was diluted, the solid concentration of the mixture is shown as a paste concentration in TABLE 4. The mixture was then further subjected to mild dispersion treatment with a high shearing force using a dispersing machine, Filmix (registered trademark) Model 40-40 (manufactured by Primix Corporation.) to obtain a fluid paste. The paste was defoamed using a vacuum bottle and a rotary pump.

The amount and the ODI of the polyaniline powder, the mole ratio of polyacrylic acid (lithium salt)/polyaniline, the amount of the conductive auxiliary agent, the amount and the concentration of polyacrylic acid (lithium salt) in the polyacrylic acid (lithium salt) solution, the amount of lithium hydroxide used to lithiate the polyacrylic acid and lithiation ratio are shown in TABLE 3 and TABLE 4. The total weight of the paste thus obtained, the solid content, the concentration of paste, the solid content of polyaniline, the solid content of conductive auxiliary agent, the solid content of polyacrylic acid, and the coating thicknesses (wet) of the paste on a collector are shown in TABLE 4 and TABLE 5.

In example 14-19, the above-mentioned paste was coated in a thickness (wet) shown in TABLE 4 on a sheet of etched aluminum foil for electric double layer capacitors (30CB; available from Hohsen Corporation) at a coating rate of 10 mm/s with a micrometer-provided doctor blade applicator using an automatic desk application device manufactured by Tester Sangyo K.K. After left standing for 45 minutes at room temperature, the layer of the paste on the foil was dried on a hot plate at a temperature of 100° C. to obtain a composite sheet comprising the collector and a cathode active material formed thereon and having a porosity shown in TABLE 5.

In example 4-13, the paste was coated in a thickness (wet) shown in TABLE 5 on a sheet of etched aluminum foil for electric double layer capacitors (30CB; available from Hohsen Corporation) at a coating rate of 10 mm/s with a micrometer-provided doctor blade applicator using an automatic desk application device manufactured by Tester Sangyo K.K. After left standing for 45 minutes at room temperature, the layer of the paste was dried on a hot plate at a temperature of 100° C. The resulting product was then pressed between a pair of stainless steel plates 15 cm square at a temperature of 140° C. under a pressure of 1.49 MPa for five minutes using a vacuum press (KVHC manufactured by Kitagawa Seiki K.K.) to provide a composite sheet comprising the cathode active material formed on the collector and having a porosity shown in TABLE 5.

Then, the composite sheet thus obtained was cut to a size of 35 mm×27 mm, and a part of the layer of active material was removed so that the layer of the active material of the composite sheet had an area of 27 mm×27 mm. A tab electrode was attached to the portion at which the layer of the active material was removed to prepare a cathode sheet. Using this cathode sheet, a laminate battery was assembled, in which an anode was so made that it had an area of 29 mm×29 mm, slightly larger than the cathode sheet.

The weight of each of the components of the cathode active material per cathode sheet, that is, the weight of each of the polyaniline, conductive auxiliary agent and polyacrylic acid, is shown in TABLE 5.

A piece of aluminum foil 50 μm thick was connected to a cathode collector (aluminum foil) with a spot welder to make a tab electrode to take out current at the cathode.

The cathode to which a tab electrode had been attached, a stainless steel mesh electrode as an anode, and a separator were vacuum dried at a temperature of 80° C., and then a piece of metal lithium was pressed against the stainless steel mesh electrode to stick the lithium metal therein to prepare an anode in a glove box having a dew point of −100° C. A separator shown in TABLE 5 was interposed between the cathode and the anode, and the resulting assembly was inserted into a laminate cell through a mouth formed by their three verges heat sealed. The position of the separator was adjusted so that the cathode and anode were in opposite position to each other correctly and did not short. Further, a sealing agent was applied to the tab electrode of each of the cathode and the anode, and the portions at which the tab electrodes were attached were so heat sealed as to leave an opening for an electrolytic solution.

A predetermined amount of electrolytic solution was poured into the laminate cell through the opening using a micropipette, and then the opening was heat sealed and closed to obtain a laminate cell. The amount of electrolytic solution used is shown in TABLE 5.

The battery performance of the laminate cell thus obtained was evaluated. TABLE 6 shows the conditions for evaluating the battery performance together with the initial charging capacity, the initial discharging capacity, the initial weight capacity density and the initial weight energy density at the first cycle, as well as the discharging capacity, the weight capacity density and the weight energy density at the fifth cycle.

TABLE 3

| | | | | | | | | |
|---|---|---|---|---|---|---|---|---|
| | colspan="9" | Materials Used For Production Of Cathode Sheet | | | | | | |
| | Polyaniline | | Conductive Auxiliary Agent | Polyacrylic Acid/Polyaniline Mole Ratio | Polyacrylic Acid Average Molecular Weight | Polyacrylic Acid Solution | | |
| Examples | g | ODI | g | % | | wt % | g | Solvent |
| 4 | 4 | 0.25 | 0.5 | 27.8 | 1,000,000 | 4.4 | 20.0 | Water |
| 5 | 6 | 0.21 | 0.75 | 27.8 | 1,000,000 | 4.4 | 30.0 | " |
| 6 | 6 | 0.21 | 0.75 | 27.8 | 1,000,000 | 4.4 | 30.0 | " |
| 7 | 4 | 0.04 | 0.5 | 27.8 | 1,000,000 | 4.4 | 20.0 | " |
| 8 | 4 | 0.11 | 0.5 | 28.4 | 25000 | 4.5 | 20.0 | " |
| 9 | 4 | 0.11 | 0.5 | 28.5 | 25000 | 4.4 | 20.5 | " |
| 10 | 4 | 0.22 | 0.5 | 50.4 | 1,000,000 | 7.6 | 21.0 | " |
| 11 | 6 | 0.024 | 0.75 | 28.7 | 1,000,000 | 4.4 | 31.0 | " |
| 12 | 4 | 0.21 | 0.5 | 27.8 | 1,000,000 | 4.4 | 20.0 | " |

TABLE 3-continued

Materials Used For Production Of Cathode Sheet

| Examples | Polyaniline g | Conductive Auxiliary Agent ODI | Polyacrylic Acid/Polyaniline g | Polyacrylic Acid Mole Ratio % | Polyacrylic Acid Average Molecular Weight | Polyacrylic Acid Solution wt % | g | Solvent |
|---|---|---|---|---|---|---|---|---|
| 13 | 4 | 0.21 | 0.5 | 27.7 | 1,000,000 | 7.6 | 11.5 | IPA |
| 14 | 4 | 0.06 | 0.5 | 28.4 | 1,000,000 | 4.4 | 20.4 | Water |
| 15 | 4 | 0.06 | 0.75 | 28.4 | 1,000,000 | 4.4 | 20.4 | " |
| 16 | 4 | 0.06 | 1.0 | 28.4 | 1,000,000 | 4.4 | 20.4 | " |
| 17 | 4 | 0.06 | 0.5 | 28.4 | 1,000,000 | 4.4 | 20.4 | " |
| 18 | 4 | 0.06 | 0.5 | 28.4 | 1,000,000 | 4.4 | 20.4 | " |
| 19 | 4 | 0.02 | 0.5 | 28.3 | 1,000,000 | 4.2 | 21.3 | " |

TABLE 4

| | Materials Used For Production Of Active Material Layer Of Cathode Sheet | | | Paste Used For Production Of Active Material Layer Of Cathode Sheet | | | | | |
|---|---|---|---|---|---|---|---|---|---|
| | Lithium Hydroxide | | | | | | Polyaniline | Conductive Auxiliary | Polyacrylic |
| Examples | Weight g | Lithiation Ratio % | Diluent | Solid Content g | Total Weight g | Paste Concentration wt % | Solid Content wt % | Agent Solid Content wt % | Acid Solid Content wt % |
| 4 | 0.00 | 0 | Water | 5.38 | 24.50 | 22.0 | 74 | 9 | 16 |
| 5 | 0.22 | 50 | " | 8.29 | 36.97 | 22.4 | 72 | 9 | 19 |
| 6 | 0.22 | 50 | " | 8.29 | 36.97 | 22.4 | 72 | 9 | 19 |
| 7 | 0.14 | 50 | " | 5.52 | 26.14 | 21.1 | 72 | 9 | 19 |
| 8 | 0.00 | 0 | " | 5.40 | 24.50 | 22.0 | 74 | 9 | 17 |
| 9 | 0.00 | 0 | " | 5.40 | 24.99 | 21.6 | 74 | 9 | 17 |
| 10 | 0.00 | 0 | " | 6.10 | 27.50 | 22.2 | 66 | 8 | 26 |
| 11 | 0.23 | 50 | " | 8.34 | 39.98 | 20.9 | 72 | 9 | 19 |
| 12 | 0.00 | 0 | " | 5.38 | 24.50 | 22.0 | 74 | 9 | 16 |
| 13 | 0.00 | 0 | IPA | 5.37 | 20.01 | 26.9 | 74 | 9 | 16 |
| 14 | 0.15 | 50 | Water | 5.55 | 29.05 | 19.1 | 72 | 9 | 19 |
| 15 | 0.15 | 50 | " | 5.80 | 30.30 | 19.1 | 69 | 13 | 18 |
| 16 | 0.15 | 50 | " | 6.05 | 30.55 | 19.8 | 66 | 17 | 17 |
| 17 | 0.30 | 100 | " | 5.70 | 32.20 | 17.7 | 70 | 9 | 21 |
| 18 | 0.30 | 100 | " | 5.70 | 38.20 | 14.9 | 70 | 9 | 21 |
| 19 | 0.15 | 50 | " | 5.54 | 28.95 | 19.1 | 72 | 9 | 19 |

TABLE 5

| | Active Material Layer Of Cathode Sheet | | | | | | Lithium Secondary Battery | |
|---|---|---|---|---|---|---|---|---|
| | Coating Thickness Of Paste (wet) | Weight Of Constituents of Active Material Layer Per Cathode Sheet (mg) | | | Lithiation Ratio Of Polyacrylic Acid | Void Ratio | Separator Constituents × Number | Amount of Electrolytic Solution |
| Examples | μm | Polyaniline | Conductive Auxiliary Agent | Polyacrylic Acid | mol % | % | of Sheets | μL |
| 4 | 360 | 34.8 | 4.4 | 7.7 | 0 | 49.5 | Nonwoven Fabric × 2 | 164 |
| 5 | 360 | 37.9 | 4.7 | 8.3 | 50 | 52.8 | *)CG2400 × 1 | 164 |
| 6 | 360 | 36.2 | 4.5 | 8.0 | 50 | 64.3 | Nonwoven Fabric × 2 | 164 |
| 7 | 360 | 70.4 | 8.8 | 15.5 | 50 | 55.1 | CG2400 × 1 | 164 |
| 8 | 360 | 18.1 | 2.3 | 4.1 | 0 | 59.7 | Nonwoven Fabric × 2 | 164 |
| 9 | 360 | 36.2 | 4.5 | 8.2 | 0 | 70.0 | Nonwoven Fabric × 2 | 164 |
| 10 | 720 | 45.9 | 5.7 | 18.3 | 0 | 49.4 | Nonwoven Fabric × 2 | 164 |
| 11 | 360 | 34.4 | 4.3 | 7.8 | 50 | 63.6 | Nonwoven Fabric × 2 | 164 |
| 12 | 360 | 27.5 | 3.4 | 6.1 | 0 | 73.2 | Nonwoven Fabric × 2 | 164 |
| 13 | 360 | 37.2 | 4.7 | 8.1 | 0 | 68.6 | Nonwoven Fabric × 2 | 164 |
| 14 | 360 | 26.5 | 3.3 | 5.9 | 50 | 73.2 | Nonwoven Fabric × 2 | 246 |
| 15 | 360 | 26.2 | 4.9 | 5.9 | 50 | 71.4 | Nonwoven Fabric × 2 | 246 |
| 16 | 360 | 24.3 | 6.1 | 5.5 | 50 | 75.0 | Nonwoven Fabric × 2 | 246 |

TABLE 5-continued

| | Active Material Layer Of Cathode Sheet | | | | | | Lithium Secondary Battery | |
|---|---|---|---|---|---|---|---|---|
| | Coating Thickness Of Paste (wet) | Weight Of Constituents of Active Material Layer Per Cathode Sheet (mg) | | | Lithiation Ratio Of Polyacrylic Acid | Void Ratio | Separator Constituents × Number | Amount of Electrolytic Solution |
| Examples | μm | Polyaniline | Conductive Auxiliary Agent | Polyacrylic Acid | mol % | % | of Sheets | μL |
| 17 | 360 | 28.3 | 3.5 | 6.4 | 100 | 68.5 | Nonwoven Fabric × 2 | 246 |
| 18 | 360 | 21.1 | 2.6 | 4.7 | 100 | 76.8 | Nonwoven Fabric × 2 | 246 |
| 19 | 360 | 25.4 | 3.2 | 5.7 | 50 | 71.3 | Nonwoven Fabric × 3 | 328 |

*)Separator made of polypropylene available from Celguard (having a porosity of 41%)

TABLE 6

| | Battery Performance | | | | | | | | |
|---|---|---|---|---|---|---|---|---|---|
| | Conditions For Evaluation Of Battery Performance | | | Battery Performance At The First Cycle | | | | Battery Performance At The Fifth Cycle | |
| | Charge/ Discharge Current Value | | Initial Charge Capacity | Initial Discharge Capacity | Initial Weight Capacity Density | Initial Weight Energy Density | Discharge Capacity | Weight Capacity Density | Weight Energy Density |
| Examples | C | 1 C mA | mA | mAh | mAh | Ah/kg | Wh/kg | mAh | Ah/kg | Wh/kg |
| 4 | 0.05 | 0.26 | 5.12 | 4.0 | 4.5 | 130 | 414 | 4.4 | 126 | 404 |
| 5 | 0.05 | 0.28 | 5.57 | 3.4 | 3.7 | 96 | 301 | 4.1 | 108 | 345 |
| 6 | 0.05 | 0.27 | 5.32 | 4.3 | 6.2 | 171 | 530 | 6.3 | 174 | 548 |
| 7 | 0.05 | 0.52 | 10.35 | 0.2 | 4.7 | 67 | 200 | 4.8 | 68 | 205 |
| 8 | 0.03 | 0.09 | 2.66 | 2.2 | 3.0 | 164 | 528 | 4.4 | 246 | 757 |
| 9 | 0.03 | 0.18 | 5.32 | 4.2 | 7.2 | 200 | 636 | 6.8 | 188 | 582 |
| 10 | 0.03 | 0.23 | 6.75 | 5.2 | 6.6 | 143 | 416 | 6.6 | 144 | 460 |
| 11 | 0.05 | 0.25 | 5.06 | 4.2 | 6.3 | 185 | 555 | 6.4 | 186 | 592 |
| 12 | 0.03 | 0.14 | 4.04 | 3.4 | 4.4 | 160 | 506 | 4.6 | 168 | 540 |
| 13 | 0.03 | 0.19 | 5.47 | 4.1 | 3.8 | 103 | 322 | 3.4 | 91 | 293 |
| 14 | 0.05 | 0.20 | 3.90 | 3.5 | 3.9 | 146 | 464 | 3.7 | 139 | 448 |
| 15 | 0.05 | 0.19 | 3.85 | 3.6 | 4.1 | 155 | 495 | 4.2 | 161 | 523 |
| 16 | 0.05 | 0.18 | 3.57 | 3.7 | 4.3 | 177 | 567 | 4.7 | 192 | 627 |
| 17 | 0.05 | 0.21 | 4.16 | 4.4 | 4.5 | 159 | 511 | 4.7 | 167 | 544 |
| 18 | 0.05 | 0.16 | 3.10 | 3.2 | 3.3 | 155 | 496 | 3.6 | 169 | 548 |
| 19 | 0.05 | 0.19 | 3.74 | 3.2 | 4.3 | 167 | 539 | 4.1 | 160 | 518 |

Example 20

11.47 g of toluidine was used in place of 10.0 g of aniline, and otherwise in the same manner as in Example 1, conductive poly(o-toluidine) which had tetrafluoroborate anions a dopant and was in an oxidized and doped state was obtained as powder. Using this conductive poly(o-toluidine), a lithium secondary battery was assembled in the same manner as in Example 1, and the battery performance was evaluated.

Figure 13:
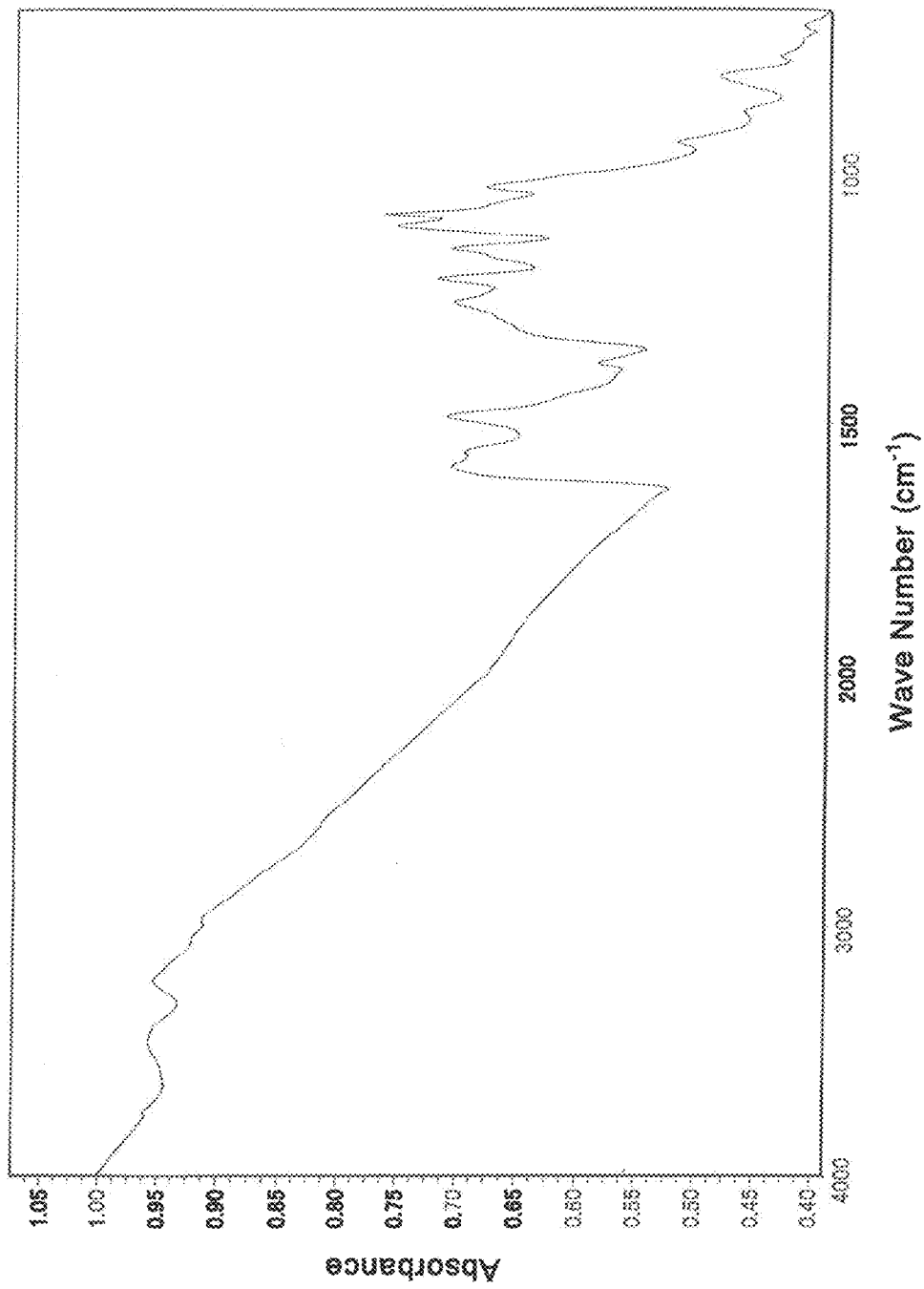
FIG. 13 is an FT-IR spectrum of a conductive poly(o-toluidine) powder having tetrafluoroborate anions as a dopant.
Figure 14:
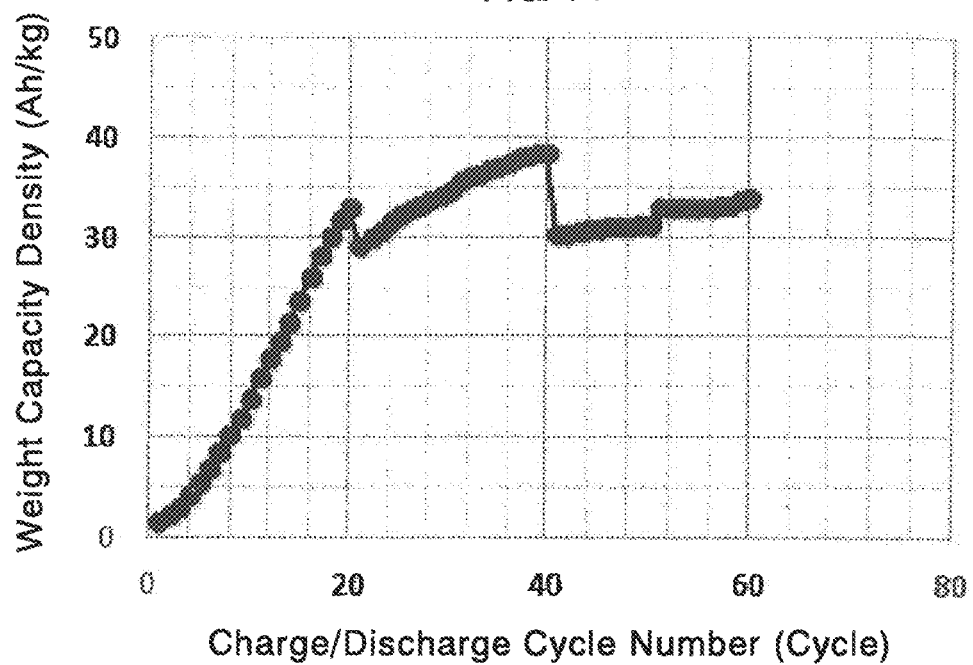
FIG. 14 is a graph showing the relation between the cycle number and weight capacity density obtained when the above-mentioned example of the lithium secondary battery of the invention of which cathode comprises a conductive poly(o-toluidine) powder having tetrafluoroborate anions as a dopant is charged and discharged.
Figure 15:
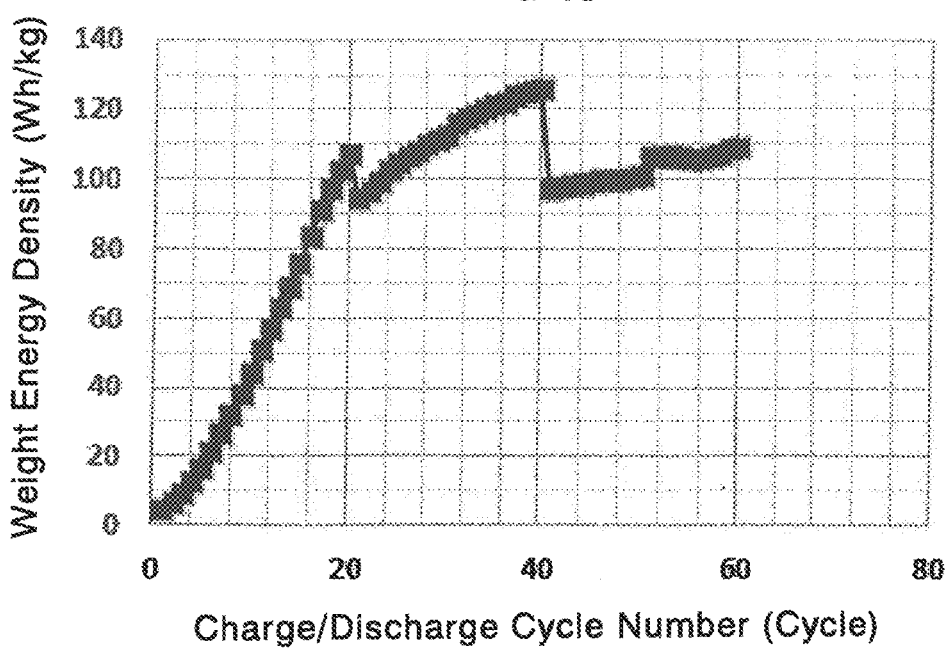
FIG. 15 is a graph showing the relation between cycle number and weight energy density obtained when the above-mentioned example of the lithium secondary battery of the invention is charged and discharged.

FIG. 13 shows an FT-IR spectrum of conductive poly(o-toluidine) which had tetrafluoroborate anions as a dopant and was in an oxidized and doped state (KBr disk). FIG. 14 shows the relation of the weight capacity density vs. charge/discharge cycle number. FIG. 15 shows the relation of the weight energy density vs. charge/discharge cycle number. In the measurement of the performance of the lithium secondary battery, the battery was discharged at a constant current of 0.1 mA from the 1et to the 20th cycle, and then discharged at a constant current of 0.5 mA from the 41st to the 60th cycle.

Figure 16:
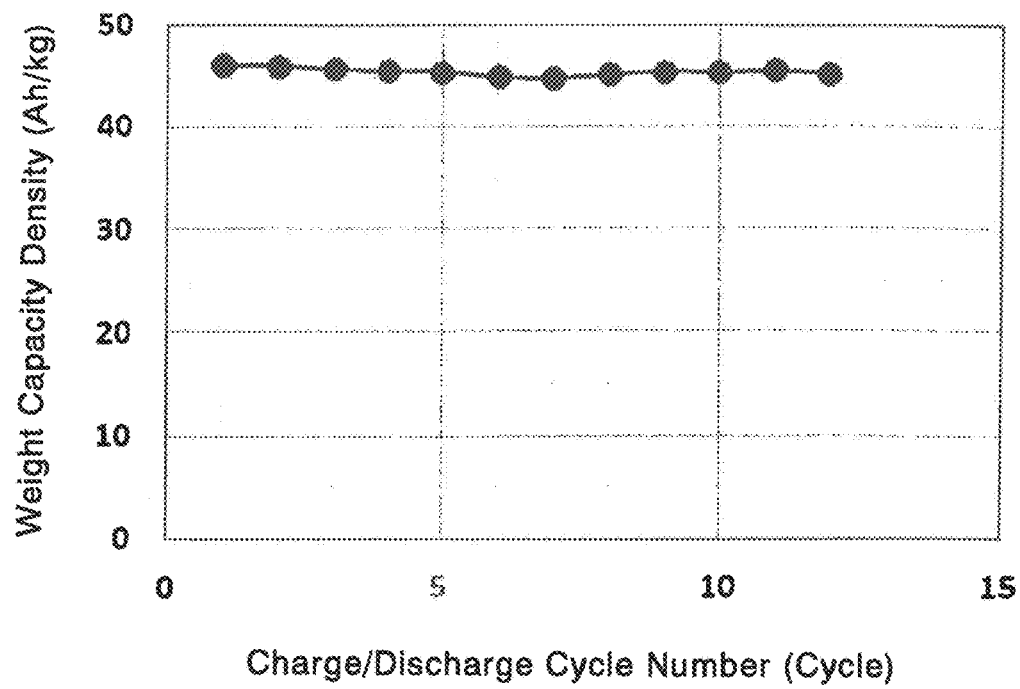
FIG. 16 is a graph showing the relation between the charge/discharge cycle number and weight capacity density obtained when the above-mentioned example of the lithium secondary battery of the invention is discharged at a constant current.
Figure 17:
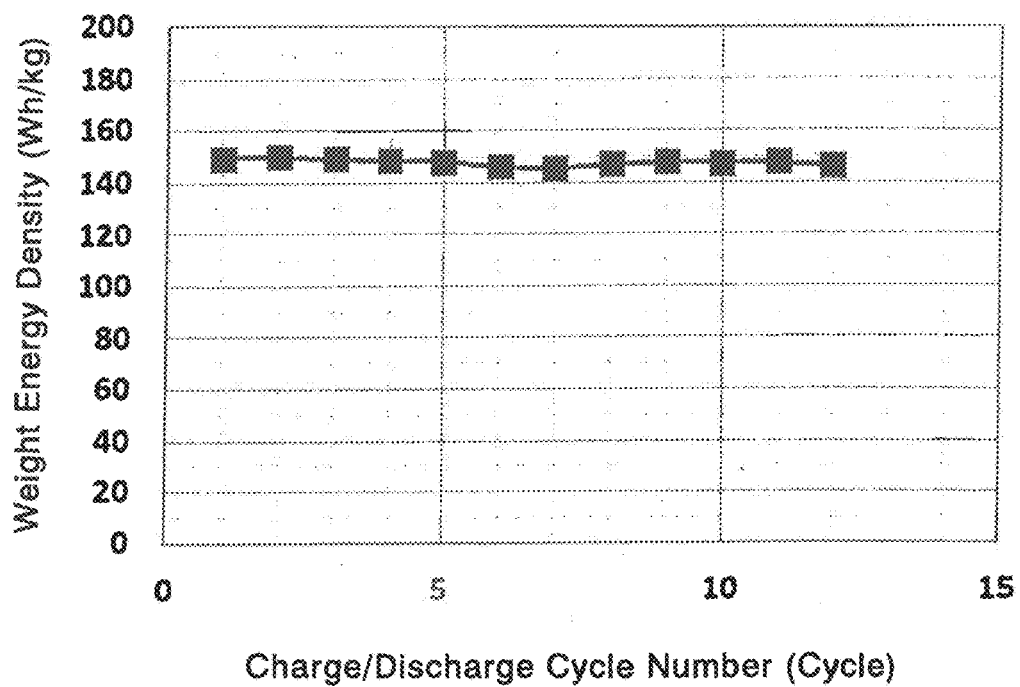
FIG. 17 is a graph showing the relation between the charge/discharge cycle number and weight energy density obtained when the above-mentioned example of the lithium secondary battery of the invention is discharged at a constant current.

The relations of each of the weight capacity density and the weight energy density vs. charge/discharge cycle number obtained when the battery was thereafter discharged at a constant current of 0.1 mA from the 1st to the 12th cycle are shown in FIG. 16 and FIG. 17. The lithium secondary battery showed stable cycle characteristics.

Example 21

(Production of Conductive Polypyrrole Powder Having Anthraquinone-2-Sulfonate Anions as a Dopant)

25 g of pyrrole (0.373 mol) was dissolved in 430 g of ion exchanged water with stirring to prepare a 5.5% by weight aqueous solution, to which was dissolved 30.5 g (0.093 mol) of sodium anthraquinone-2-sulfonate monohydrate.

Figure 18:
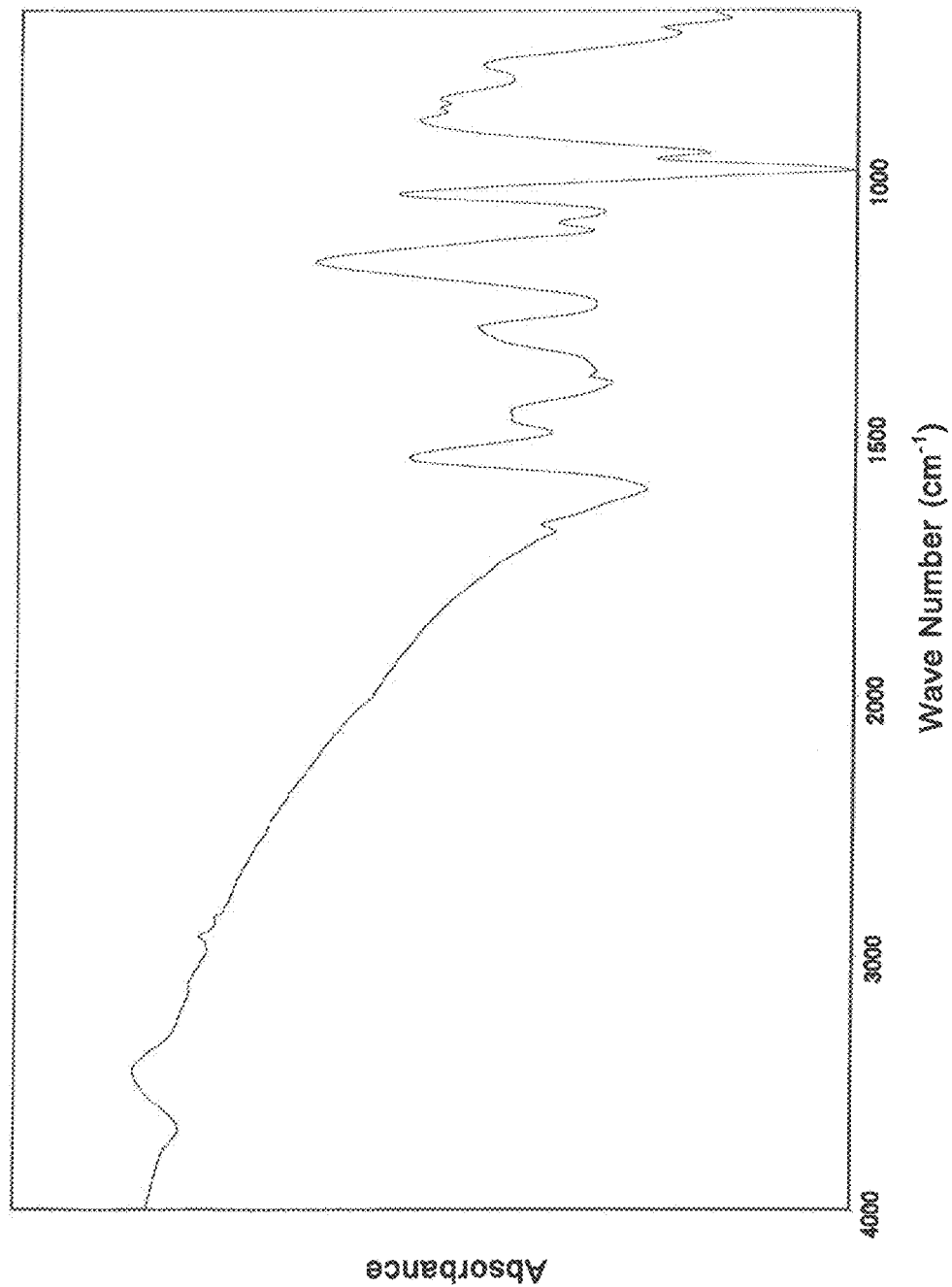
FIG. 18 is an FT-IR spectrum of a conductive polypyrrole powder having anthraquinone-2-sulfonate anions as a dopant.

Then, 243 g of 35% by weight aqueous solution of ammonium peroxodisulfate was added dropwise in portions to the solution of pyrrole containing the sodium anthraquinone-2-sulfonate in two hours. After the reaction, the resulting reaction mixture was vacuum filtrated using a Buchner funnel and a suction bottle to provide black powder. The powder was washed with water, and then with acetone, followed by vacuum drying in a desiccator at a room temperature for ten hours, to provide 25.5 g of conductive polypyrrole having anthraquinone-2-sulfonate anions as a dopant as black powder. FIG. 18 is an FT-IR spectrum of the conductive polypyrrole powder in a doped state.

In the FT-IR spectrum, 3455 $cm^{-1}$ is assigned to N—H stretching vibration; 1670 $cm^{-1}$ is assigned to stretching vibration of carbonyl groups of anthraquinone-2-sulfonate anions; 1542 $cm^{-1}$ is assigned to stretching vibration of C—C double bonds of pyrrole rings; 1453 $cm^{-1}$ is assigned to C—H bending vibration of pyrrole rings: 1290 $cm^{-1}$ is assigned to C—N stretching vibration of pyrrole rings; and 1164 $cm^{-1}$ is assigned to stretching vibration of S—O double bonds of anthraquinone-2-sulfonate anions.

The S/N atomic ratio in the above-mentioned conductive polypyrrole powder was found to be 0.15 as measured by ESCA, showing that the doping rate by the anthraquinone-2-sulfonate anions was found to be 0.15.

(Conductivity of Conductive Polypyrrole Powder)

130 mg of the above-mentioned conductive polypyrrole powder was press molded to provide a disk 13 mm in diameter and 720 μm in thickness. The disk was subjected to measurement of conductivity by van der Pauw method. The conductivity was found to be 10 S/cm.

(Production of a Cathode Sheet Comprising Conductive Polypyrrole Powder)

3 g of the conductive polypyrrole powder was mixed with 0.44 g of conductive carbon black (Denka Black; available from Denki Kagaku Kogyo K.K.). The mixture was added to 24 g of 4.5% by weight aqueous solution of polyacrylic acid half lithium salt. The resulting mixture was kneaded with a spatula, and was then subjected to dispersion treatment using a supersonic wave homogenizer to provide a dispersion. 5 g of ion exchanged water was added to the dispersion, and the resultant was subjected to dispersion treatment using a supersonic wave homogenizer to provide a paste. The paste was then further subjected to mild dispersion treatment at a linear velocity of 20 m/s for 30 seconds with a high shearing force using a dispersing machine, Filmix (registered trademark) Model 40-40 (manufactured by Primix Corporation) to obtain a viscose paste.

Then in the same manner as in Example 1, the paste was coated on a sheet of etched aluminum foil for electric double layer capacitors (30CB; available from Hohsen Corporation) at a coating rate of 10 mm/s with a micrometer-provided doctor blade applicator using an automatic desk application device manufactured by Tester Sangyo K.K. After air drying for 45 minutes at room temperature, the layer of the paste was dried on a hot plate at a temperature of 100° C. to provide a composite sheet.

The composite sheet thus obtained had a cathode active material which comprised the conductive polypyrrole powder, polyacrylic acid, and the conductive carbon black powder and which was found to have a porosity of 65.9%.

A disk was punched out from the composite sheet using a punching jig having a punching blade 15.95 mm in diameter to prepare a cathode sheet. Metal lithium (coin-shaped metal lithium; available from Honjo Kinzoku K.K.) was used as an anode, while nonwoven fabric TF40-50 manufactured by Hohsen Corporation and having a porosity of 68% was used as a separator. These members were incorporated in a stainless steel HS cell for experimental nonaqueous electrolyte secondary battery manufactured by Hohsen Corporation. The cathode sheet and the separator was vacuum dried at a temperature of 100° C. for five hours in a vacuum dryer before they were incorporated in the HS cell. The electrolytic solution used was a 1 mol/d $m^3$ solution of lithium tetrafluoroborate (LIBF$_4$) in ethylene carbonate/dimethyl carbonate (available from Kishida Kagaku K.K.). A lithium secondary battery was assembled in an atmosphere of super high purity argon gas in a glove box having a dew point of −100° C.

The performance of the thus assembled lithium secondary battery was evaluated in a constant current-constant voltage charge/constant current discharge mode using a current charge/discharge device (SD8 manufactured by Hokuto Denko K.K.). That is, unless otherwise specified, the lithium secondary battery was charged at a constant current with the final charging voltage of 3.8 V, and after the voltage reached 3.8 V, the lithium secondary battery was charged at a constant voltage until the current value reached 20% of the current value while the lithium secondary battery was charged at a constant current, followed by discharging at a constant current to the final discharging voltage of 2.0 V.

The results obtained when the lithium secondary battery was subjected to charge/discharge test at a charge/discharge rate of 0.5 C are shown as the curves of PALiDR=0.31(1) and (2) in FIG. 19. Herein the drawing, PALiDR=0.31 means that in the preparation of cathode active material, the polyacrylic acid half lithium salt was used in an amount (in moles) 0.31 times as much as the amount (in moles) of the nitrogen atoms of the polypyrrole, that is, the DR (doping rate) was 0.31.

A lithium secondary battery of which cathode comprises conductive polypyrrole needs to be charged/discharged to some degree until a predetermined capacity is obtained, that is, the battery needs initial activation. FIG. 19 shows the relation between the charge/discharge cycle number and the weight capacity density during the process of initial activation of the lithium secondary battery of which cathode comprises conductive polypyrrole.

The doping rate of the polypyrrole have been said to be usually 0.25 so far, and when the polypyrrole has the doping rate, the theoretical weight capacity density per weight of polypyrrole is 103 mAh/g. However, as the performance of lithium secondary battery comprising conductive polypyrrole and polyacrylic acid is shown as the curve of PALiDR=0.31 in FIG. 19, the capacity density per weight of polypyrrole at the cathode is as high as 120-130 mAh/g, which exceeds the value of 103 mAh/g. This value is 0.3 when converted to a doping rate of polypyrrole, and is higher than 0.25, a value which has been conventionally accepted doping rate.

The results of charge/discharge cycle tests of lithium secondary battery comprising a cathode sheet prepared by using a binder composed of a mixture of styrene-butadiene copolymer (SBR)/carboxymethylcellulose (CMC) in place of lithium polyacrylate are also shown as the curves of SBR/CMC (1) and (2) in FIG. 19.

In turn, PPy-PALi in FIG. 20 is a plotted curve of weight capacity density obtained when the charge/discharge current value of lithium secondary battery provided with a cathode comprising conductive polypyrrole and polyacrylic acid was increased from 0.05 C to 100 C, that is., the rate characteristics. In the same manner, the curve PPy-SBR/CM shows the rate characteristics of lithium secondary battery provided with a cathode comprising conductive polypyrrole and SBR/CMC. Both the lithium secondary batteries retain a high capacity density at a charge/discharge rate of 10 C or higher, thus being superior in rapid charge/discharge performance.

Figure 21:
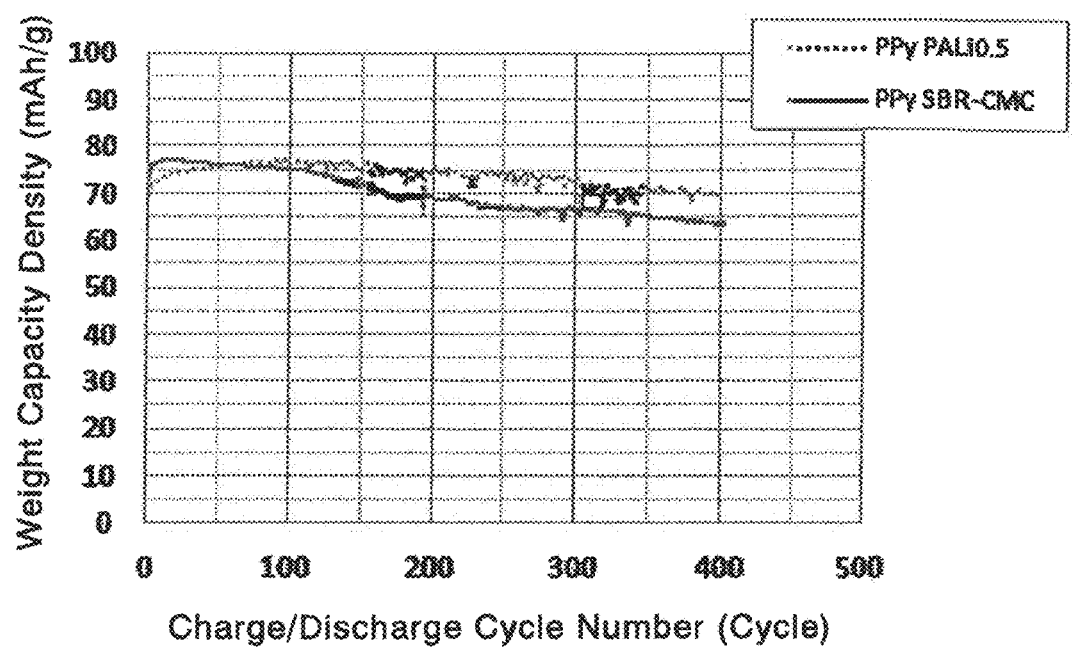
FIG. 21 is a graph showing the relation between the charge/discharge cycle number and weight capacity density of the above-mentioned lithium secondary battery of the invention.

FIG. 21 shows cycle characteristics of lithium secondary battery (PPy-PALi0.5) provided with a cathode comprising conductive polypyrrole and polyacrylic acid, and of a lithium secondary battery (PPy-SBR/CMC) provided with a cathode comprising conductive polypyrrole and SBR/CMC at a charge/discharge rate as high as 10 C. Both the batteries were found to maintain a capacity retention as high as 85-90% even at a relatively many charge/discharge cycles of 400.

Comparative Example 2

A lithium secondary battery was assembled using neither polyacrylic acid nor SBR/CMC, but using conductive polypyrrole powder obtained in Example 21 as it was as a binder, and otherwise in the same manner as in Example 21. Namely, a metal lithium anode and a separator were incorporated in an HS cell manufactured by Hohsen Corporation, and the separator was wetted with electrolytic solution, and then a predetermined amount of conductive polypyrrole powder was adhered onto the separator, thereby a battery was assembled.

The weight density data and the charge/discharge rate characteristics in the initial activation process of lithium secondary battery thus obtained are shown as two curves of "no binder (1)" and "no binder (2)" in FIG. 19, and as a curve of "PPY-no binder" in FIG. 20. When the cathode contained neither polyacrylic acid nor SBR/CMC as a binder, the weight capacity density of the resulting lithium secondary battery was lower than 103 mAh/g or the theoretical capacity density, as shown by "no binder" in FIG. 19. That is, it is clear that the resulting lithium secondary battery had a capacity smaller than the lithium secondary battery obtained by using polyacrylic acid or SBR/CMC as a binder according to the present invention.

It is also cleat that the above-mentioned lithium secondary battery is inferior in rate characteristics as compared with the lithium secondary battery obtained by using polyacrylic acid as a binder according to the invention, as shown by the results of "PPY-no binder" in FIG. 20.

Example 21

(Production of Cathode Sheet Comprising Conductive Polyaniline Powder)

4.00 g of the conductive polyaniline powder obtained in Example 1 was mixed with 0.45 g of conductive carbon black (Denka Black; available from Denki Kagaku Kogyo K.K.). The mixture was mixed with 1.43 g of aqueous solution of polymaleic acid (Nonpole PMA-50W containing polymaleic acid in an amount of 50% by weight; available from Nichiyu K.K.) and 16.0 g of distilled water, and the resulting mixture was kneaded with a spatula. The mixture was then subjected to dispersion treatment using a supersonic wave homogenizer to provide a dispersion, and then subjected to high rate dispersion treatment at a linear velocity of 20 m/s for 30 seconds using a dispersing machine, Filmix (registered trademark) Model 40-40 (manufactured by Primix Corporation) to obtain a fluid paste. The paste was defoamed for three minutes.

Then, the defoamed paste was coated on a sheet of etched aluminum foil for electric double layer capacitors (30CB; available from Hohsen Corporation) at a coating rate of 10 mm/s with a micrometer-provided doctor blade applicator using an automatic desk application device manufactured by Tester Sangyo K.K. After air drying for 45 minutes at room temperature, the layer of the paste was dried on a hot plate at a temperature of 100° C. to provide a composite sheet.

The composite sheet thus obtained had a layer of the cathode active material which comprised the conductive polyaniline powder, the conductive carbon black powder, and polyacrylic acid, and was found to have a thickness of 44 μm and a porosity of 56%.

A laminate cell was assembled in the same manner as in Examples 4 to 19. The materials used for preparation of cathode sheet, the composition of paste, the ratios of materials in the layer of active material, the conditions for assembling the laminate cell, and the obtained battery performance data are shown in TABLE 7 to TABLE 10. The laminate cell assembled using polymaleic acid as a binder was found to have a high capacity density and energy density in the same manner as the case where a polyacrylic acid binder was used.

TABLE 7

| | Materials Used For Production Of Active Material Layer Of Cathode Sheet | | | | | | |
|---|---|---|---|---|---|---|---|
| | Polyaniline | | Conductive Auxiliary Agent | Polymaleic Acid/Polyaniline Mole Ratio | Polymaleic Acid Average Molecular | Solution Of Polymaleic Acid | | |
| Examples | g | ODI | g | % | Weight | wt % | g | Solvent |
| 21 | 4 | 0.2 | 0.5 | 27.8 | — | 50 | 1.4 | Water |

TABLE 8

| | Materials Used For Production Of Active Material Layer Of Cathode Sheet | | | Paste Used For Production Of Active Material Layer Of Cathode Sheet | | | | | |
|---|---|---|---|---|---|---|---|---|---|
| | Lithium Hydroxide | | | | | | Polyaniline | Conductive Auxiliary | Polyacrylic |
| | | | | Solid | Total | Paste | Solid | Agent Solid | Acid Solid |
| Examples | Weight g | Lithiation Ratio % | Diluent | Content g | Weight g | Concentration wt % | Content wt % | Content wt % | Content wt % |
| 21 | — | — | Water | 5.2 | 22.1 | 24.0 | 77 | 9 | 14 |

TABLE 9

Active Material Layer Of Cathode Sheet

| Examples | Coating Thickness Of Paste (wet) μm | Weight Of Constituents Of Active Material Layer Per Cathode Sheet (mg) | | | Lithiation Ratio Of Polyacrylic Acid mol % | Void Ratio Of Active Material Layer % | Lithium Secondary Battery | |
|---|---|---|---|---|---|---|---|---|
| | | Polyaniline | Conductive Auxiliary Agent | Polymaleic Acid | | | Separator Constituents × Number Of Sheets | Amount Of Electrolytic Solution μL |
| 21 | 360 | 7.4 | 0.9 | 1.2 | 0 | 55.7 | Nonwoven Fabric × 3 | 230 |

TABLE 10

Battery Performance

| | Conditions For Evaluation Of Battery Performance | | Battery Performance At The First Cycle | | | | Battery Performance At The Fifth Cycle | | |
|---|---|---|---|---|---|---|---|---|---|
| | Charge/Discharge Current Value | 1 C | Initial Charge Capacity | Initial Discharge Capacity | Initial Weight Capacity Density | Initial Weight Energy Density | Discharge Capacity | Weight Capacity Density | Weight Energy Density |
| Examples | C mA | mA | mAh | mAh | Ah/kg | Wh/kg | mAh | Ah/kg | Wh/kg |
| 21 | 0.05 | 0.101 | 2.03 | 1.9 | 2.0 | 145 | 458 | 2.0 | 147 | 472 |

Example 22

(Production of a Cathode Sheet Comprising Polyaniline in a Reduced and Dedoped State)

4.4 g of polyacrylic acid (having a weight average molecular weight of 1000000; available from Wake Pure Chemical Industries, Ltd.) was added to 95.6 g of ion exchanged water, and left standing over night so that it swelled. Then, the resulting mixture was treated for one minute with a supersonic wave homogenizer so that it was dissolved in the ion exchanged water to provide 100 g of uniform and viscous aqueous solution of polyacrylic acid having a concentration of 4.4% by weight.

0.73 g of lithium hydroxide powder was added to 100 g of the aqueous solution of polyacrylic acid to lithiate the half of the amount of the carboxylic groups that the polyacrylic acid possessed to prepare an aqueous solution of polyacrylic acid half lithium salt.

4.0 g of the conductive polyaniline powder which was obtained in Example 3 and was in a reduced and dedoped state was mixed with 0.5 g of conductive carbon black powder (Denka Black; available from Denki Kagaku Kogyo K.K.). The mixture was added to 20.4 g of the aqueous solution of polyacrylic acid half lithium salt and kneaded together with a spatula.

The resulting mixture was subjected to dispersion treatment using a supersonic wave homogenizer to provide a dispersion, and then subjected to mild dispersion treatment with a high shearing force using a dispersing machine, Filmix (registered trademark) Model 40-40 (manufactured by Primix Corporation) to obtain a fluid paste. The paste was defoamed using a suction bottle and a rotary pump.

The defoamed paste was coated in a thickness of 360 μm on a sheet of etched aluminum foil for electric double layer capacitors (30CB; available from Hohsen Corporation) at a coating rate of 10 mm/s with a micrometer-provided doctor blade applicator using an automatic desk application device manufactured by Tester Sangyo K.K.

The resulting was air dried for 45 minutes at room temperature, and was then dried on a hot plate at a temperature of 100° C., followed by pressing between a pair of stainless steel plates 15 cm square at a temperature of 140° C. under a pressure of 1.5 MPa for five minutes using a vacuum press (KVHC manufactured by Kitagawa Seiki K.K.) to provide a composite sheet. This composite sheet was used as a cathode sheet as set forth in the following.

(Production of Laminate Cell)

Two shoots of porous membrane formed of polypropylene obtained from Hohsen Corporation (Celgard (registered trademark) 2400 produced by Celgard; having a thickness of 25 μm, a porosity of 38%, an air permeability of 620 s/100 cm$^3$) were put together to prepare a separator. The anode was metal lithium foil 50 μm thick obtained from Honjo Kinzoku K.K.

Then, the anode, cathode and separator were assembled to provide a stack. More particularly, the separator was interposed between the cathode and the anode to prepare the stack. The stack was put in an aluminum laminated package, and vacuum dried at 80° C. for two hours.

LiPF$_6$ was dissolved in a concentration of 1 mol/d m$^3$ in a solvent composed of ethylene carbonate and dimethyl carbonate in a volume ratio of 1:1 to prepare an electrolytic solution. The electrolytic solution was poured into the laminated package, and then the package was sealed to provide a nonaqueous electrolyte secondary battery of the invention. The electrolytic solution was poured into the package in an atmosphere of super high purity argon gas in a glove box having a dew point of −90° C.

The performance of the thus assembled nonaqueous electrolyte secondary battery was evaluated in a constant temperature bath at a temperature of 25° C. The performance was evaluated in a constant current-constant voltage charge/constant current discharge mode using a current charge/discharge device (SD8 manufactured by Hokuto Denko K.K.). The battery was charged at 0.174 mA with the final charging voltage of 3.8 V, and after the voltage reached 3.8 V, the battery was charged at a constant voltage of 3.8 V until the current value attenuated to 0.035 mA, whereupon the capacity obtained was regarded as the charging capacity. Then, the battery was discharged at a constant current of 0.174 mA until the final charging voltage of 2.0 V was reached.

The battery performance of the thus obtained laminate cell was evaluated. The battery was found to have a charge capacity of 3.7 mAh, a discharge capacity of 3.7 mAh, a weight capacity density of 157 Ah/kg and a weight energy density of 502 Wh/kg at the first cycle, and a discharge capacity of 3.5 mAh, a weight capacity density of 149 Ah/kg and a weight energy density of 480 Wh/kg at the third cycle.

The polyaniline particles used in the invention have a pleated structure, which is now explained. The observation of the polyaniline particles by transmission electron microscopes (TEM) reveals that the circumference of the polyaniline particle has minute and uneven structure composed of projections 20-300 nm high which can be referred to as a pleated structure. Such a pleated structure can be confirmed by staining the polyaniline particles with ruthenic acid vapor to stain the particles with the heavy metal. The pleated structure cannot be clearly observed when the polyaniline particles are not stained with the heavy metal.

The heavy metal staining of polyaniline powder was carried out as in such a manner as mentioned below. Polyaniline powder in a reduced and dedoped state was put in a sample bottle container made of glass. Another bottle which was the same as the sample bottle container mentioned above was prepared, and ruthenic acid was put thereinto. The two bottles were then put so that their mouths were opposite to each other, and connected to each other by sealing the connected portion with polyolefin film, "Parafilm" (registered trademark; stretchable and adhesive film for sealing use; available from 3M), thereby the polyaniline powder was exposed to ruthenic aid vapor to stain the powder with the heavy metal.

Figure 22:
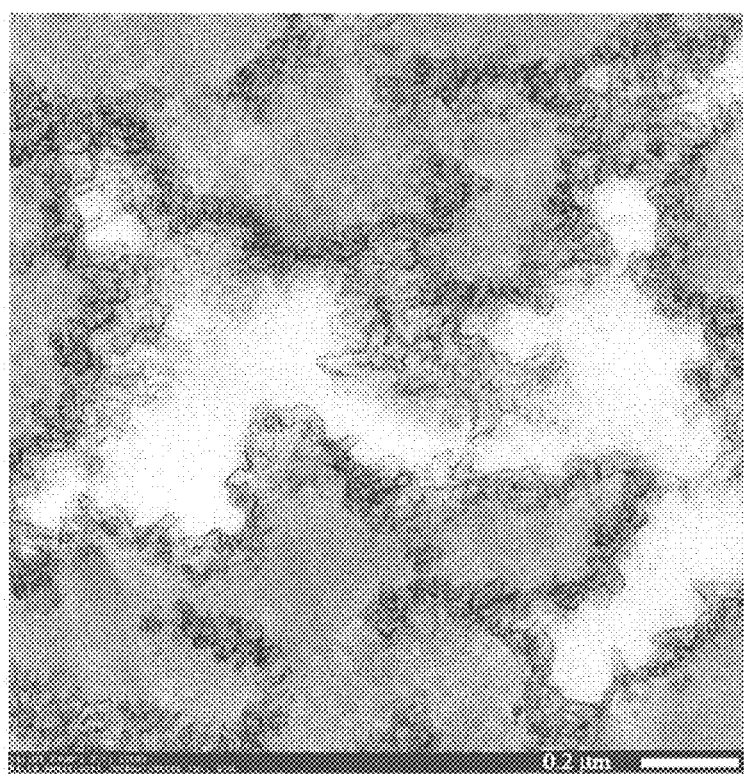
FIG. 22 is a TEM image of reduced and dedoped polyaniline after it has been stained with ruthenic acid.

The polyaniline powder thus stained with the heavy metal was embedded in an embedding resin (epoxy resin). After the resin was cured, thin sections were prepared using a microtome, followed by subjecting to TEM observation. FIG. 22 shows a TEM image of ruthenic acid stained polyaniline in a reduced and dedoped state obtained in Example 3. The portions looking white are the embedding resin, where initially there was cavity. The portions looking gray are the polyaniline, and the portions looking black at circumferences of the polyaniline are the "pleated structure". It is observed that the pleated structure developed both at the outer and inner interfaces.

As set forth above, the portions of pleated structure are observed as projections 20-300 nm high in the circumference of polyaniline particles. The polyaniline particles thus have a large specific surface area because of the pleated structure. Therefore, the pleated structure that the polyaniline particles have may be one of the reasons that the lithium secondary battery provided with a cathode comprising the polyaniline according to the invention has a high charge/discharge output performance.

Figure 23:
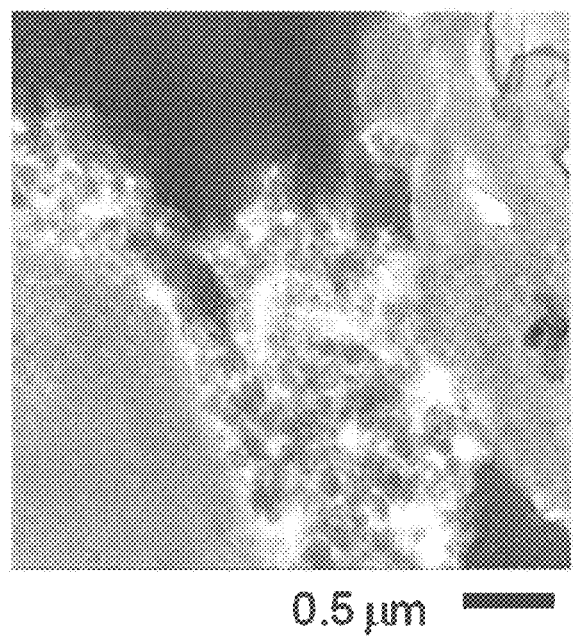
FIG. 23 is a TEM image of a section parallel to the surface of a cathode sheet comprising conductive polyaniline.

In the TEM observation of the cathode sheet comprising the polyaniline powder in a reduced and dedoped state, the conductive auxiliary agent and the polyacrylic acid mentioned in Example 3, the pleated structure can also be observed at circumferences of the polyaniline particles. FIG. 23 is a TEM image of a section parallel to the surface of the cathode sheet of Example 3. In the TEM image, the black portions at the left upper are composed of embedding resin where initially there was cavity. The gray portions at the left lower are phases where there are found much polyaniline. The approximately central portions contiguous to the gray portions where white portions and gray portions are minutely mixed together are phases composed of much of conductive auxiliary agent or carbon black, and polyacrylic acid. At the uneven portions at the circumferences of phases composed of much polyaniline are seen the pleated structure.

The pleated structure found at polyaniline particles was also confirmed in the TEM image of the section of the cathode sheet. That is, the presence of pleated structure was confirmed on the surface of polyaniline particles in the cathode.

Example 23

The production of conductive poly(o-toluidine) was carried out at a scale 10 times larger than in Example 20 to prepare conductive poly(o-toluidine) powder having tetrafluoroborate anions as a dopant as dark green powder.

The thus obtained conductive poly(o-toluidine) powder in a doped state was added to a 2 mol/d m$^3$ aqueous solution of sodium hydroxide, and the mixture was stirred for 30 minutes to neutralize the conductive poly(o-toluidine), thereby dedoping the dopant, the tetrafluoroborate anions, from the poly(o-toluidine).

The thus dedoped poly(o-toluidine) was washed with water until the filtrate became neutral, stirred and washed in acetone, subjected to filtration using a Buchner funnel and a suction bottle, thereby the dedoped poly(o-toluidine) powder was collected on a No. 2 filter paper. The dedoped poly(o-toluidine) powder was vacuum dried for 10 hours at a room temperature to provide dedoped poly(o-toluidine) as brown powder.

The thus obtained dedoped poly(o-toluidine) powder was put in an aqueous methanol solution of phenylhydrazine, and the resulting mixture was stirred for 30 minutes so that the dedoped poly(o-toluidine) was reduced, whereupon the color of the poly(o-toluidine) powder turned gray from brown.

Figure 24:
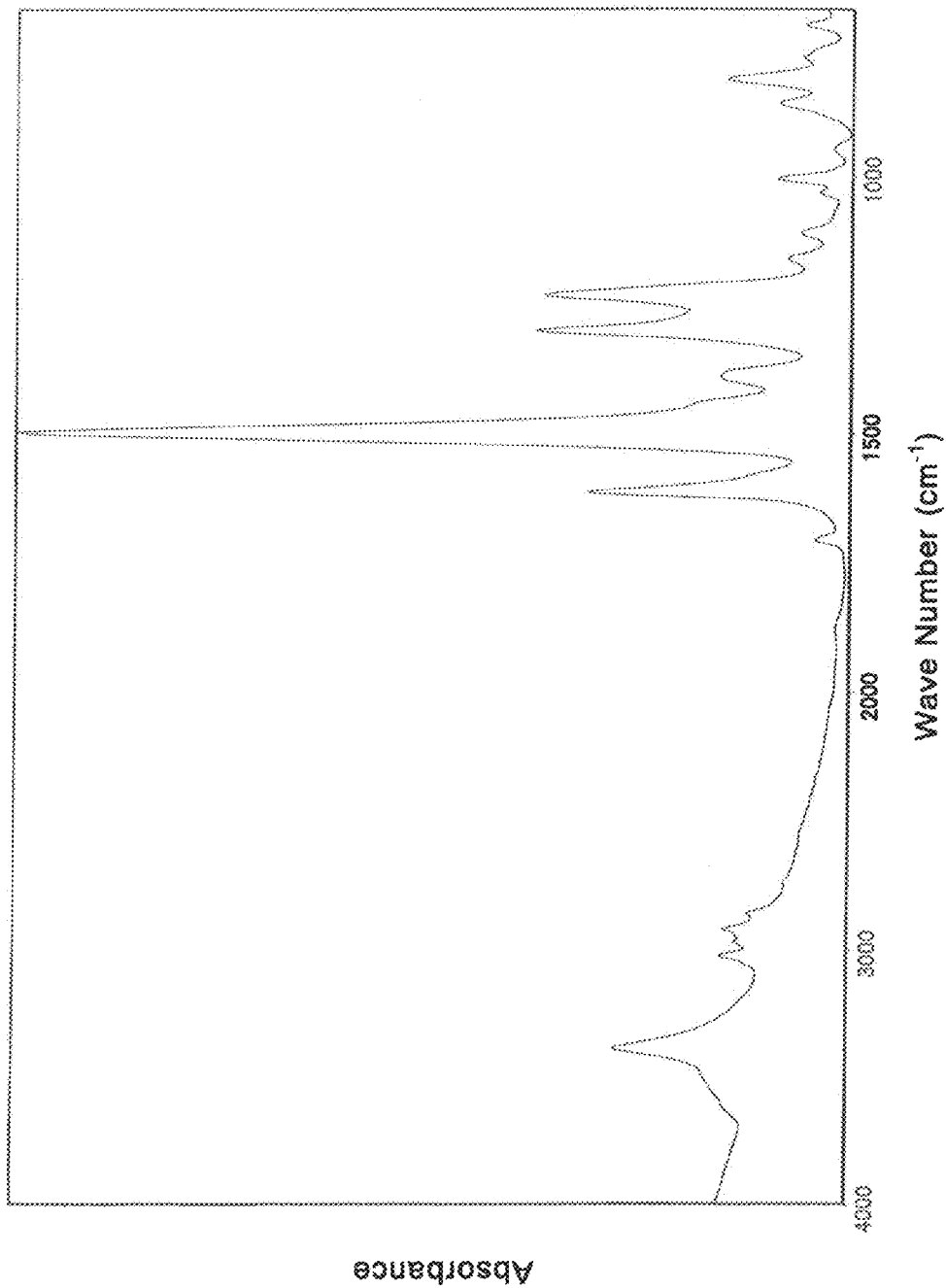
FIG. 24 is an FT-IR spectrum of a reduced and dedoped poly(o-toluidine) powder (KBr disk)

The thus reduced poly(o-toluidine) powder was washed with methanol, and then with acetone, collected by filtration, and the obtained powder was vacuum dried at a room temperature, to provide poly(o-toluidine) powder in a reduced and dedoped state. FIG. 24 is an FT-IR spectrum of the poly(o-toluidine) in a reduced and dedoped state (KBr disk).

0.73 g of lithium hydroxide powder was added to 100 g of 4.4% by weight concentration aqueous solution of polyacrylic acid to lithiate the half of the amount of the carboxylic groups of the polyacrylic acid to prepare an aqueous solution of polyacrylic acid half salt.

3.0 g of the poly(o-toluidine) in a reduced and dedoped state was mixed with 3.0 g of conductive carbon black powder (available from Denki Kagaku Kogyo K.K.). The resulting mixture was added to 13.3 g of aqueous solution of the polyacrylic acid half lithium salt and was dispersed therein using a supersonic wave homogenizer to prepare a dispersion. The dispersion was subjected to mild dispersion treatment with a high shearing force using a dispersing machine, Filmix (registered trademark) Model 40-40 (manufactured by Primix Corporation) to obtain a fluid paste. The paste was defoamed using a vacuum bottle and a rotary pump.

The paste was coated on a sheet of etched aluminum foil for electric double layer capacitors (30CB; available from Hohsen Corporation) at a coating rate of 10 mm/s with a micrometer-provided doctor blade applicator using an automatic desk application device manufactured by Tester Sangyo K.K. using a doctor blade applicator provided with a micrometer of an automatic desk application device manufactured by Tester Sangyo K.K. After left standing for 45 minutes at room temperature, the layer of the paste on the foil was dried on a hot plate at a temperature of 100° C., to provide a composite sheet. The composite sheet thus obtained had a cathode active material which comprised the polyacrylic acid half lithium salt, the poly(o-toluidine) in a reduced and dedoped state and conductive carbon black powder, and which was found to have a porosity of 72%.

Figure 25:
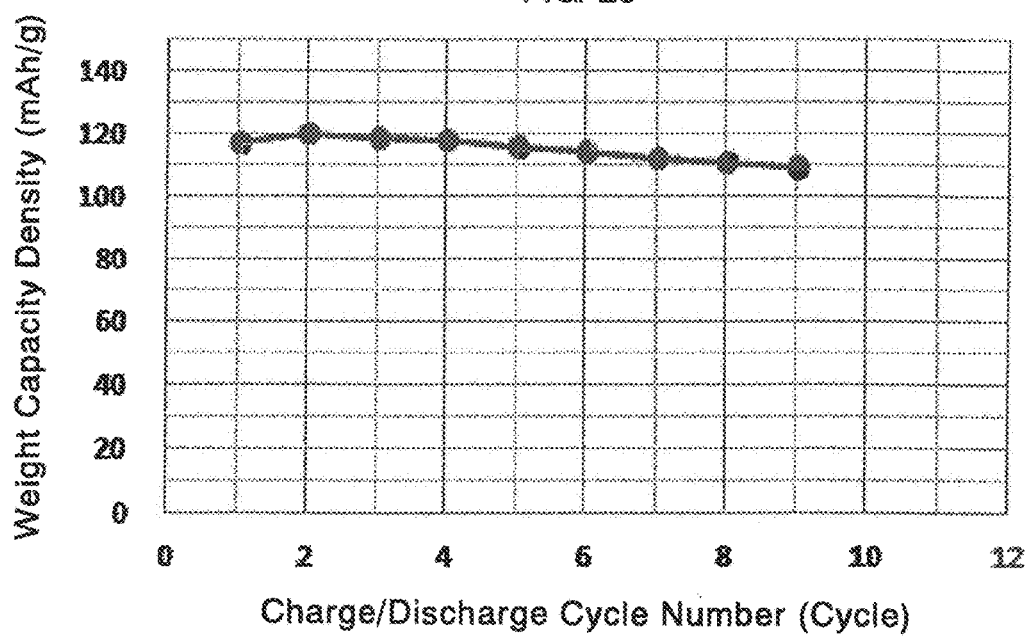
FIG. 25 is a graph showing the relation between the cycle number and weight capacity density obtained when an example of the lithium secondary battery of the invention of which cathode comprises the reduced and dedoped poly(o-toluidine) powder mentioned above is charged and discharged.

A disk was punched out from the composite sheet using a punching jig having a punching blade 15.95 mm in diameter to prepare a cathode sheet. This cathode sheet was incorporated in an HS cell in the same manner as in Example 1 to assemble a lithium secondary battery, and the performance of the battery was evaluated in the same manner as in Example 1. FIG. 25 shows the relation between the weight capacity density vs. the charge/discharge cycle number.

The lithium secondary battery comprising the poly(o-toluidine) in a reduced and dedoped state was found to have a weight capacity density about 2.5 times higher in relation to the charge/discharge cycles than that of the lithium secondary battery comprising the conductive poly(o-toluidine) having tetrafluoroborate anions as a dopant, as clear when FIG. 25 is compared with FIG. 14.

In this example in which poly(o-toluidine) in a reduced and dedoped state was used, the weight capacity density was calculated by using only the weight of poly(o-toluidine) which was in a reduced and dedoped state and had no dopant.

Comparative Example 3

(Performance of Lithium Secondary Battery Provided with a Cathode Sheet Comprising a Binder Comprising Styrene-Butadiene Copolymer Rubber (SBR)/Poly(N-Vinylpyrrolidone) Mixture and Polyaniline in a Reduced and Dedoped State)

4.8 g of polyaniline powder which was obtained in Example 3 and was in a reduced and dedoped state was dry mixed with 0.6 g of conductive carbon black (Denka Black; available from Denki Kagaku Kogyo K. K.). Separately, 0.37 g of SBR emulsion (TRD2001; having an SBR content of 48% by weight; available from JSR K.K.) and 2.12 g of solution of poly(N-vinylpyrrolidone) (K-90W; having a content of 19.8% by weight; available from Nippon Shokubai K.K.) were mixed and stirred to prepare a white aqueous dispersion.

The above-mentioned mixture of polyaniline powder in a reduced and dedoped state and the conductive carbon black, and then 6.9 g of ion exchanged water, were added in this order to the dispersion, followed by dispersion treatment using a supersonic wave homogenizer. The resulting dispersion was further subjected to dispersion treatment using a supersonic wave homogenizer to provide a dispersion, and then subjected to mild dispersion treatment with a high shearing force using a dispersing machine, Filmix (registered trademark) Model 40-40 (manufactured by Primix Corporation) to obtain a fluid paste. The paste was defoamed using a suction bottle and a rotary pump.

A cathode sheet was prepared by using the thus prepared binder in the same manner as in Example 3. The cathode sheet was incorporated in an HS cell to assemble a lithium secondary battery, and the performance of the battery was evaluated. As a result, the battery was found to have an initial weight capacity density of 100 Ah/kg when the battery was discharged at a rate of 0.05 C. The results of rate tests measured as the charge/discharge current value was changed are shown in FIG. 26.

Figure 26:
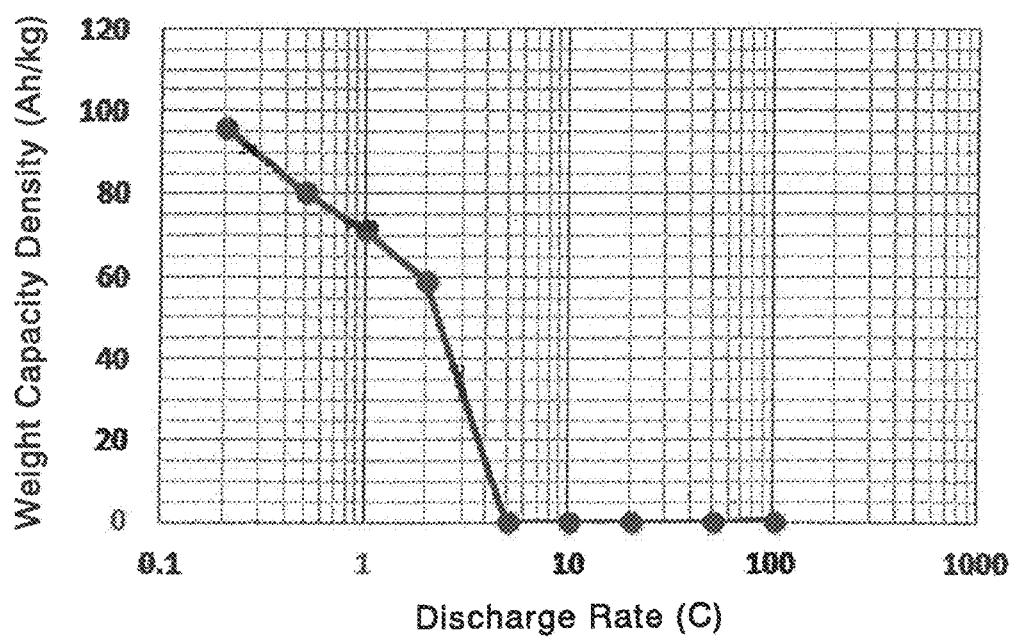
FIG. 26 is a graph showing the results of rate tests of a lithium secondary battery as a comparative example which is provided with a cathode sheet comprising a binder composed of a mixture of styrene-butadiene copolymer rubber and poly(N-vinylpyrrolidone), together with a reduced and dedoped polyaniline.

As clear from the results shown in FIG. 26, the lithium secondary battery was found to have a weight capacity density of about 100 Ah/kg. Also in the rate test, when the discharge rate reached 5 C, almost no capacity was taken out. Thus, as compared with the lithium secondary battery provided with a cathode obtained by using a binder comprising polycarboxylic acid, the lithium secondary battery obtained in this comparative example was found to be remarkably inferior in rate characteristics.

Comparative Example 4

(Performance of Lithium Secondary Battery Provided with a Cathode Comprising a Binder Comprising Polystyrene Sulfonic Acid and Polyaniline in a Reduced and Dedoped State)

7.5 g of 30% by weight solution of polystyrene sulfonic acid (available from Sigma-Aldrich) was used in place of 20.4 g of aqueous solution of polyacrylic acid half lithium salt, and otherwise in the same manner as in Example 3, a lithium secondary battery was assembled using an HS cell. The performance of the resulting battery was evaluated.

As a result, the lithium secondary battery was found to have a very low weight capacity density. It was found that the weight capacity density increased gradually little by little with the charge/discharge cycle number; however, it was at most 2.2 mAh/g even at the 50th cycle. Thus, the lithium secondary battery provided with a cathode obtained by using a polymer having sulfonic acid groups as a binder was found to have a very low weight capacity density and inferior in battery performance.

The invention claimed is:

1. A nonaqueous electrolyte secondary battery having a cathode and an anode arranged so as to be opposite to each other, and an electrolyte layer put therebetween;
   wherein the cathode comprises:
   (a) a conductive polymer and
   (b) at least one selected from the group consisting of a polycarboxylic acid and a metal salt of a polycarboxylic acid, and
   wherein the anode comprises a material into which a base metal or ions thereof are inserted and from which a base metal or ions thereof are extracted;
   wherein the conductive polymer is a polymer having as a dopant at least one protonic acid anions selected from the group consisting of inorganic acid anions, aliphatic sulfonic acid anions, aromatic sulfonic acid anions, polymer sulfonic acid anions and polyvinylsulfuric acid anions;
   wherein the polymer constituting the conductive polymer is at least one selected from the group consisting of polyaniline, a polyaniline derivative, polypyrrole, a polypyrrole derivative, and polythiophene; and
   wherein the polycarboxylic acid is at least one polymer selected from the group consisting of polyacrylic acid, polymethacrylic acid, polyvinylbenzoic acid, polyallylbenzoic acid, polymethallylbenzoic acid, polymaleic acid, polyfumaric acid, polyglutaminic acid, polyaspartic acid, alginic acid, carboxymethylcellulose, and a copolymer comprising repeating units of at least two of the polymers listed herein.

2. The nonaqueous electrolyte secondary battery according to claim 1, wherein the metal salt of polycarboxylic acid is at least one selected from the group consisting of an alkali metal salt of polycarboxylic acid and an alkaline earth metal salt of polycarboxylic acid.

3. The nonaqueous electrolyte secondary battery according to claim 1, which is a lithium secondary battery.

4. The nonaqueous electrolyte secondary battery according to claim 1, wherein the polymer constituting the conductive polymer is polyaniline or a polyaniline derivative.

5. A cathode sheet for use in a nonaqueous electrolyte secondary battery, which comprises a composite material comprising a collector and a layer of a cathode active material provided thereon,
wherein the layer of a cathode active material comprises:
(a) a conductive polymer and
(b) at least one selected from the group consisting of a polycarboxylic acid and a metal salt polycarboxylic acid;
wherein the conductive polymer is a polymer having as a dopant at least one protonic acid anions selected from the group consisting of inorganic acid anions, aliphatic sulfonic acid anions, aromatic sulfonic acid anions, polymer sulfonic acid anions and polyvinylsulfuric acid anions;
wherein the polymer constituting the conductive polymer is at least one selected from the group consisting of polyaniline, a polyaniline derivative, polypyrrole, a polypyrrole derivative, and polythiophene; and
wherein the polycarboxylic acid is at least one polymer selected from the group consisting of polyacrylic acid, polymethacrylic acid, polyvinylbenzoic acid, polyallylbenzoic acid, polymethallylbenzoic acid, polymaleic acid, polyfumaric acid, polyglutaminic acid, polyaspartic acid, alginic acid, carboxymethylcellulose, and a copolymer comprising repeating units of at least two of the polymers listed herein.

6. The cathode sheet for use in a nonaqueous electrolyte secondary battery according to claim 5, wherein the salt of the polycarboxylic acid is at least one selected from the group consisting of an alkali metal salt of polycarboxylic acid and an alkaline earth metal salt of polycarboxylic acid.

7. The cathode sheet for use in a nonaqueous electrolyte secondary battery according to claim 5 or claim 6, which is for use in a lithium secondary battery.

8. The cathode sheet for use in a nonaqueous electrolyte secondary battery according to claim 5, wherein the polymer constituting the conductive polymer is polyaniline or a polyaniline derivative.

* * * * *